US006415392B1

(12) United States Patent
Suzuki et al.

(10) Patent No.: US 6,415,392 B1
(45) Date of Patent: Jul. 2, 2002

(54) REMOTE DIAGNOSIS SYSTEM AND METHOD

(75) Inventors: Kobun Suzuki, Kawasaki; Shin Yamaguchi, Chiba, both of (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 09/206,295

(22) Filed: Dec. 7, 1998

(30) Foreign Application Priority Data

| Dec. 8, 1997 | (JP) | 9-337401 |
| Dec. 17, 1997 | (JP) | 9-348143 |
| Dec. 19, 1997 | (JP) | 9-351725 |

(51) Int. Cl.$^7$ .............................................. H02H 3/05
(52) U.S. Cl. .............................. 714/27; 713/168; 399/9
(58) Field of Search ........................ 714/25, 27; 399/8, 399/24, 26, 9; 709/222, 223; 345/433, 112, 136, 520, 5, 333; 700/17, 83; 600/545; 713/168

(56) References Cited

U.S. PATENT DOCUMENTS

| 3,854,125 A | * 12/1974 | Ehling et al. .................. 714/27 |
| 5,434,650 A | * 7/1995 | Nakahara et al. ............. 399/8 |
| 5,583,615 A | * 12/1996 | Hashimoto et al. ............ 399/8 |
| 5,715,496 A | * 2/1998 | Sawada et al. ................ 399/8 |
| 5,786,938 A | * 7/1998 | Chang ........................ 359/617 |
| 5,798,738 A | * 8/1998 | Yamada .......................... 345/2 |
| 5,913,090 A | * 6/1999 | Sawada et al. ................ 399/8 |
| 6,073,253 A | * 6/2000 | Nordstrom et al. ........... 714/25 |
| 6,141,507 A | * 10/2000 | Sawada |
| 6,260,160 B1 | * 7/2001 | Beyda et al. .................. 714/27 |

* cited by examiner

Primary Examiner—Robert Beausoleil
Assistant Examiner—Rita Ziemer
(74) Attorney, Agent, or Firm—Oblon, Spivak, McClelland, Maier & Neustadt, P.C.

(57) ABSTRACT

A remote diagnosis system includes a central computer system that receives user data related to a user request and deals with the user request data, and at least one kind of image-forming apparatus connected to the central computer system. Each image-forming apparatus has a user request data input device, through which data related to a user request is optionally input, and a user request data transmitting device that transmits the user request data to the central computer system. A data communication adapter collects the user request data from the at least one kind image forming apparatus and transmits the user request data to the central computer system. An interface interfaces the at least one kind of image-forming apparatus with the data communication adapter, and a public communication network connects the data communication adapter with the central computer system. The central computer system includes a plurality of request-dealing computers each separately taking charge of at least one prescribed kind of image-forming apparatus to deal with the user request, and a request-receiving computer that receives the user request data from the at least one kind of image-forming apparatus and automatically distributes the user request data to the prescribed request-dealing computer based on identification data included in the user request data.

27 Claims, 27 Drawing Sheets

Fig. 5

| Identification Codes of Image Forming Apparatuses | Model Number | Serial Number | Name of User | Name of Person of Window of User | TEL No | Address | |
|---|---|---|---|---|---|---|---|
| | | | | | | | |

Fig. 6

| Request dealing computer Classification | Name of Staff | Response capable Model ||||
|---|---|---|---|---|---|
| | | Copier | FAX | PR | Duplicator |
| First Copier Request Dealing Computer | A | 1 | 0 | 0 | 0 |
| Second Copier Request Dealing Computer ⋮ | B | 1 | 1 | 1 | 0 |
| First Facsimile Request Dealing Computer | a | 0 | 1 | 0 | 0 |
| Second Facsimile Request Dealing Computer ⋮ | b | 1 | 1 | 0 | 0 |

Fig. 11

Data Storing Table (T2)

| Model | Number of Machine | Problem Kind | Name of user | User ID | Data Received time |
|---|---|---|---|---|---|
| XXXX | 001001 | xxx | AAAAAAAA | uaaaa | 9:10:03 |
| YYYY | 003580 | www | BBBBBBBB | ubbbb | 9:31:50 |
| XXXX | 002135 | yyy | CCCCCCCC | ucccc | 10:00:05 |
| YYYY | 030100 | www | DDDDDDDD | udddd | 10:03:10 |
| . | . | . | . | . | . |
| . | . | . | . | . | . |
| ZZZZ | 029870 | zzz | ZZZZZZZZ | uzzzz | 13:21:40 |

Fig. 12

Table of User Priority Order of dealing (T3)

| User ID | Priority Level of dealing |
|---|---|
| uaaaa | A |
| ubbbb | A |
| ucccc | B |
| udddd | C |
| ⋮ | ⋮ |
| uzzzz | A |

Fig. 13

Priority Level & Displaying Color Designation Table (T4)

| Priority Level of Dealing | Displaying Color |
|---|---|
| A | Color |
| A | Color |
| B | Color |
| C | Color |
| . | . |
| . | . |
| A | Color |

Fig. 14

Table Storing Data arranged in priority Order (T5)

| Model | Number of Machine | Accident Kind | Name of user | Data Received time | Priority |
|---|---|---|---|---|---|
| XXXX | 001001 | xxx | AAAAAAAA | 9:10:03 | A |
| YYYY | 003580 | www | BBBBBBBB | 9:31:50 | A |
| XXXX | 029870 | zzz | ZZZZZZZZ | 13:21:40 | A |
| YYYY | 002135 | yyy | CCCCCCCC | 10:00:05 | B |
| . | . | . | . | . | . |
| . | . | . | . | . | . |
| YYYY | 030100 | www | DDDDDDDD | 10:03:10 | C |

Fig. 15

Received Data Storing Table (T2)

| Model | Number of Machine | Problem Kind | Name of user | User ID | Data Received time |
|---|---|---|---|---|---|
| XXXX | 001001 | xxx | AAAAAAAA | uaaaa | 9:10:03 |
| ZZZZ | 029870 | zzz | ZZZZZZZZ | uzzzz | 13:21:40 |
| . | . | . | . | . | . |
| . | . | . | . | . | . |
| YYYY | 030100 | www | DDDDDDDD | udddd | 15:30:00 |
| XXXX | 002135 | yyy | CCCCCCCC | ucccc | 15:30:00 |
| YYYY | 003580 | www | BBBBBBBB | ubbbb | 15:30:00 |

Fig. 16

Table Storing Data arranged in priority order (T5)

| Model | Number of Machine | Problem Kind | Name of user | Data Received time | Priority |
|---|---|---|---|---|---|
| XXXX | 001001 | xxx | AAAAAAAA | 9:10:03 | A |
| ZZZZ | 029870 | zzz | ZZZZZZZZ | 13:21:40 | A |
| YYYY | 003580 | www | BBBBBBBB | 15:30:00 | A |
| XXXX | 002135 | yyy | CCCCCCCC | 15:30:00 | B |
| . | . | . | . | . | . |
| . | . | . | . | . | . |
| YYYY | 030100 | www | DDDDDDDD | 15:30:00 | C |

| MODEL NAME | MACHINE NUMBER | PROBLEM KIND | USER NAME | DATA RECEIVED TIME |
|---|---|---|---|---|
| XXXX | 001001 | xxx | AAAAAAAA | 9:10:03 |
| YYYY | 003580 | www | BBBBBBBB | 9:31:50 |
| XXXX | 002135 | yyy | CCCCCCCC | 10:00:05 |
| . | . | . | . | . |
| . | . | . | . | . |
| . | . | . | . | . |
| . | . | . | . | . |
| ZZZZ | 029870 | zzz | ZZZZZZZZ | 13:21:40 |

ADDITION OF NEW DATA RECEIVED

| MODEL NAME | MACHINE NUMBER | PROBLEM KIND | USER NAME | DATA RECEIVED TIME |
|---|---|---|---|---|
| XXXX | 001001 | xxx | AAAAAAAA | 9:10:03 |
| YYYY | 003580 | www | BBBBBBBB | 9:31:50 |
| XXXX | 002135 | yyy | CCCCCCCC | 10:00:05 |
| . | . | . | . | . |
| . | . | . | . | . |
| . | . | . | . | . |
| . | . | . | . | . |
| ZZZZ | 029870 | zzz | ZZZZZZZZ | 13:21:40 |
| YYYY | 004096 | yyy | VVVVVV | 14:03:20 |

FIG. 19
(BACKGROUND ART)

| MODEL NAME | MACHINE NUMBER | PROBLEM KIND | USER NAME | DATA RECEIVED TIME |
|---|---|---|---|---|
| XXXX | 001001 | xxx | AAAAAAAA | 9:10:03 |
| YYYY | 003580 | www | BBBBBBBB | 9:31:50 |
| XXXX | 002135 | yyy | CCCCCCCC | 10:00:05 |
| . | . | . | . | . |
| . | . | . | . | . |
| . | . | . | . | . |
| . | . | . | . | . |
| ZZZZ | 029870 | zzz | ZZZZZZZZ | 13:21:40 |

⇩ DELETION OF DATA WHEN REQUEST IS DEALT

| MODEL NAME | MACHINE NUMBER | PROBLEM KIND | USER NAME | DATA RECEIVED TIME |
|---|---|---|---|---|
| XXXX | 001001 | xxx | AAAAAAAA | 9:10:03 |
| XXXX | 002135 | yyy | CCCCCCCC | 10:00:40 |
|  |  |  |  |  |
| . | . | . | . | . |
| . | . | . | . | . |
| . | . | . | . | . |
| . | . | . | . | . |
| ZZZZ | 029870 | zzz | ZZZZZZZZ | 13:21:40 |

Fig. 21

| SC Number Table |
|---|
| 108 |
| 115 |
| . . . |
| 511 |

(Time Chart Illustrating When SC is Dealt & corresponding Image Forming Apparatus stops Operation)

(Time Chart Illustrating When SC continues & corresponding Image Forming Apparatus is on the way of Operation)

(Time Chart Illustrating When corresponding
Image Forming Apparatus stops Operation)

REMOTE DIAGNOSIS SYSTEM AND METHOD

BACKGROUND OF THE INVENTION

1. Field of the Invention

This invention relates to remote diagnosis systems and methods for supervising a plurality of image-forming apparatuses each located at a user side remote from a control center and which are connected with the control center via a public communication network, a data communication adapter, a wired or a wireless interface, etc. In particular, the present invention relates to remote diagnosis systems and methods which can suppress increasing a number of operators who operate a computer at a control center.

2. Discussion of the Background

A background remote diagnosis system generally supervises a plurality of image-forming apparatuses such as OA machines (Office Automation machines) each located at a user side, such as a business office, from a control center. In a background remote diagnosis system, data, for example of a total amount of consumable items, are collected from the plurality of image-forming apparatuses and are used, for example, to maintain the image-forming apparatuses.

As a maintenance, the background remote diagnosis system automatically dials, for example based on a self-recognition of its operational condition, the control center to inform the control center of any problem created in an image forming apparatus or the like. Further, a communication from the control center to each of the image-forming apparatuses is generally executed using the remote diagnosis system. This communication can send data related to a repair or an adjustment of parts to the image-forming apparatuses.

Further, a total copy count, data of which are stored in a copy counter employed in the image-forming apparatus (and which data is generally confirmed by directly calling on a user by a service person, or the like, or by making a telephone call thereto), can be automatically collected using the remote diagnosis system. This data can be used to calculate, for example, a monthly maintenance fee based on the total copy count in accordance with a maintenance contract exchanged between the user and an image-forming apparatus supplier.

Further, in such a background remote diagnosis system, an order of consumable items, such as toner, copy sheets, and so on, can be sent to the control center, and an inquiry thereto about a fatigue of an image, generation of an unusual sound, an operation know-how, and so on, can be generally made by the user using a telephone line.

The background remote diagnosis system is explained in more detail referring to FIGS. 9 and 10. FIG. 9 illustrates using a block chart a central computer sub-system 80 that constitutes a part of a background central computer system. The central computer sub-system 80 includes a plurality of user request-receiving computers 82 each operated by an operator and each having a hard disk 83 therein, and a plurality of operator telephones 81 each used by the operator.

The central computer sub-system 80 further includes a plurality of request-dealing computers 84 each operated by a staff and each provided corresponding to a kind of image forming apparatus, a plurality of telephones 85 each used by a staff, and a network 86, such as a LAN (local Area Network), that connects the user request-receiving computers 82 with the request-dealing computers 84.

A receipt of a user request and a request-dealing operation executed by the central computer sub-system 80 are each illustrated in FIG. 10 using a flow chart. The central-computer-sub system 80 accepts user requests via telephones 81 in steps S21, S23, S25, S27 from different devices. The operator may hear a user's name, a model of the image-forming apparatus, contents of a request, a telephone number of a user, and so on. Then, in steps S22, S24, S26, S26, the operator inputs such data as user request data into his or her user request-receiving computer 82 through a keyboard or the like to store the user data in a request receiving database (hereinafter referred to as a DB) installed in the hard disk (hereinafter referred to as HDD) 83.

The operator then determines in step S29 a prescribed staff having a request-dealing computer 84 who is in charge of dealing with a request from a prescribed model of an image-forming apparatus, and then communicates the data thereto so that the request is dealt by the staff. The operator then inputs the user request data and data indicating a recipient of the user request data to store both the data in the request-receiving database of the HDD 83. For example, if a model that has called up the telephone 81 to make a request is a copier, i.e. YES in step S21, the operator inputs data in step S22 indicating the copier and data indicating a request-dealing computer 84 which may handle the request from the copier are input into the request-receiving database of HDD 83.

The user request-receiving computer 82 then sends both the data to the prescribed request-dealing computer 84 determined by the operator through the network 86 in step S29. The prescribed request-dealing computer 84 displays contents of the data on a display thereof so that the contents are confirmed by the staff when the data is received from one of the user request-receiving computers 82. The staff then deals with the request, for example, by having a service person call on the user to repair or to maintain the image-forming apparatus or by making a telephone call to give advice to the user after he or she has confirmed the contents of the requests of the user.

However, in such a background remote diagnosis system, an operator is required for each of the user request-receiving computers 82. Further, since the operator of the request-receiving computer 82 has to determine which staff is suitable to deal with a request and to send data of the request based on his or her determination thereof, a load on the operator and an operation time for the operator increases, thereby resulting in a non-quick response.

Further, the more request calls from users, the more frequent the chance of operational mistakes. This is because when the number of request calls increases, the number of request-receiving computers 82 is required to correspondingly increase, and accordingly the number of operators must also increase. Further, if the number of kinds of image-forming apparatuses to be supervised increases, a request data distribution work of the operators may become more complex. Moreover, an amount of work for the operators cannot be even dispersed, and thereby the jobs may be concentrated on a prescribed operator or operators. Further, it is basically an issue for a user that requests cannot be dealt in the priority order.

Further, the background remote diagnosis system generally functions as described below.

First, image-forming apparatuses automatically make self-calls to send data related to a problem created in the image-forming apparatus to the central computer sub-system 80 through a communication 4, e.g. a wired or wireless interface, a communication adapter, and a public communication network, when the problem is created therein. Second, the central computer sub-system 80 displays contents of the problem data on a display when received in an order of arrival thereof.

In such a background remote diagnosis system, since a problem such as a paper jam created in any of the image-forming apparatuses is informed to a central computer and contents thereof are displayed on the display of the central computer sub-system 80, an operator working at the central computer sub-system 80 may judge that the image-forming apparatus having the problem can be reset to cause the image forming apparatus to return to its initial state (hereinafter referred to as a RESET VALID status).

If the image-forming apparatus that has the problem is in the RESET VALID status, the staff makes a telephone call to the user of the image-forming apparatus to ask the user to reset a status of the image-forming apparatus to address the problem by turning its reset switch to return the image-forming apparatus to the initial status and then report a result of the reset operation. The staff can have a service person call on the user to reset a status of the image-forming apparatus having the problem. However, an operation time and a care of either the staff or the service person increases in number corresponding to an increase in the number of users.

Further, in a background image-forming apparatus, a plurality of data related to problems created in image-forming apparatuses are transmitted to the central computer sub-system 80 and displayed on a display of the designated request-dealing computer 84 in a data receiving order. Thus, the operator can do nothing without resolving the problems in the data receiving order.

To display the data of problems, the background remote diagnosis system provides a table (T1) that stores data related to problems created in image-forming apparatuses by arranging the data in a data receiving order as illustrated in FIG. 17. The data is then displayed on a display of a request-dealing computer 84 to be supervised by a staff. The data displayed on the display can be changed using a keyboard or a mouse so that the staff can search for desired data. Contents of the table (T1) can be renewed either by adding newly received data thereto or deleting data therefrom when the image-forming apparatus having the problem indicated by the data has been resolved as illustrated in FIGS. 18 and 19.

However, since problem data is displayed on the display in a data receiving order and in a same color, the below described issues may occur. First, problem data sent from a very important user or image-forming apparatus, which is to be dealt with in a precedent over other users, cannot be easily identified by the staff of the request-dealing computer 84 through the display. Second, a case in which problem data to which a priority is not to be given over others tends to increase in number.

SUMMARY OF THE INVENTION

In consideration of the-above problems, it is an object of the present invention to provide a novel remote diagnosis system that efficiently deals with, for example, a user request.

The remote diagnosis system includes a central computer system that receives user request data related to a user request and deals with the request. At least one kind of image-forming apparatus for forming images is connected to the central computer system and includes a user request data inputting device, through which user request data is input, and a data transmitting device that transmits the user request data to the central computer system.

The remote diagnosis system further includes a data communication adapting device that collects the user request data from the at least one kind of image-forming apparatus and transmits the user request data to the central computer system, an interface that interfaces the at least one kind of image-forming apparatuses with the data communication adapting device, and a public communication network that connects the data communication adapting device with the central computer system.

The central computer system further includes a plurality of request-dealing terminal computers, which each separately takes charge of a kind of image-forming apparatus to deal with the user request, and a request receiving computer that receives the user request data from the at least one kind of image-forming apparatus and automatically distributes the user request data to the prescribed request-dealing computer responsible to the user request.

The remote diagnosis system can also include a request dealing computer determining device employed in the request-receiving computer, which determines at least one prescribed request-dealing computer to which the user request data is transferred based on identification data included in the received user request data.

The remote diagnosis system can further include a request data remaining determining device that determines whether in a prescribed request-dealing computer a prescribed amount of user request data remains to be dealt with, and a user request data transfer controlling device that controls the user request data transferring device such that the user request data is transferred only when the prescribed amount of user request data does not remain in the prescribed request-dealing computer. The request-receiving computer can deal with a plurality of user request data in a prescribed priority order.

A modified remote diagnosis system includes a user request data receiving and storing device that receives a plurality of user request data and then stores the user request data in an order of a receiving time of the user request data. The modified remote diagnosis system further includes a priority-order-determining device that determines a priority order of dealing with the user requests, a displaying device that displays the user request data, and a display-controlling device that controls the displaying device such that the user request data are displayed in the priority order.

The display controlling device can further control a displaying device such that user request data are displayed in order of a user request data receiving time when a plurality of user request data having the same priority are received by a user request data receiving device. The displaying device can further display the user request data having different priority levels in different colors.

The request-dealing computer can also include a response time-setting device, through which a prescribed time period corresponding to a kind of image-forming apparatus or a user for dealing with the user request are input, and a displaying device that displays user request data in a different manner when the user request data has not been dealt with within the prescribed time period set by the response-time-setting device. The display-controlling device can give a first priority to user request data that has not yet been dealt with within a prescribed time period, and can then arrange a plurality of user request data in a prescribed priority order.

Another modified remote diagnosis system includes a central computer system that receives data related to a problem and resolves the problem. At least one kind of image-forming apparatus for forming images is connected to the central computer system and which includes a self-call data generating device that generates self-call data constituted by its own identification data and problem data, and a self-call data transmitting device that transmits the self-call data to the central computer system by its self-calling.

The modified remote diagnosis system further includes a data communication adapting device that collects the self-call data from the at least one kind of image-forming apparatus and transmits the self-call data to the central computer system, and an interface that interfaces the at least one kind of image-forming apparatus with the data communication adapting device. The modified remote diagnosis system further includes a public communication network that connects the data communication-adapting device with the central computer system.

The central computer system includes a plurality of problem resolving terminal computers which each separately takes charge of a prescribed at least one kind of image-forming apparatus to resolve problems created therein. Each of the request dealing computers may include a condition determining device that determines if the problem created in a prescribed image-forming apparatus has been resolved by a user by resetting a status of the image forming apparatus having the problem. Each of the request dealing computers further may include a reset command transmitting device that transmits a reset command to the image-forming apparatus only when the image-forming apparatus is determined as not being reset by the user.

The status-determining device disposed in the image-forming apparatus can determine a status of the image forming apparatus when the image-forming apparatus receives the reset command. A response transmitting device can be disposed in the image-forming apparatus and can transmit valid or invalid answer data to the central computer system through the interface, data communication adapting device, and data communication network depending on the status of the image-forming apparatus.

Invalid answer data can be generated when an image forming apparatus is determined to have resolved the problem or is executing an image formation, and valid answer data can be generated when an image-forming apparatus is determined to have not yet resolved the problem or is not executing an image formation. The invalid answer data can be constituted by BUSY response data that indicates that an image-forming apparatus is executing an image formation when a reset command for resetting a status of the image-forming apparatus of the problem is received during image formation of the image-forming apparatus. The reset command-transmitting device can retransmit a reset command, when the BUSY response data is not received by the central computer system. The reset command-transmitting device can further retransmit a reset command after an image-forming apparatus stops its image formation when a BUSY response is received by the central computer system.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein:

FIG. 5 is a chart that illustrates a user database registered in another HDD stored in a DB server of the request-receiving computer;

FIG. 6 is a chart that illustrates a staff supervising table registered in another HDD stored in the DB server;

FIG. 11 is a chart that illustrates one example of a reception data table stored in the HDD illustrated in FIG. 2;

FIG. 12 is a chart that illustrates one example of a table indicating a dealing order of user requests of priority;

FIG. 13 is a chart that illustrates one example of a table indicating both priority levels of user request-dealing order and colors corresponding to the priority levels;

FIG. 14 is a chart that illustrates one example of a table in which a plurality of user request data are arranged in a dealing order of priority;

FIG. 15 is a chart that illustrates one example of a table in which a plurality of user request data are arranged in a prescribed order when a plurality of user request data are simultaneously received;

FIG. 16 is a chart that illustrates one example of a table in which a plurality of user request data are arranged in a prescribed order when a plurality of problem data are simultaneously received;

FIG. 19 is a chart that illustrates a table used in a background remote diagnosis system, in which a plurality of user request data are arranged in a prescribed order and renewed when the user request data is deleted due to the request having been dealt;

FIG. 21 is a chart that illustrates one example of a table to be provided in a HDD, in which service person call numbers are stored;

DETAILED DESCRIPTION OF THE PREFERRED EMBODIMENTS

Figure 1:
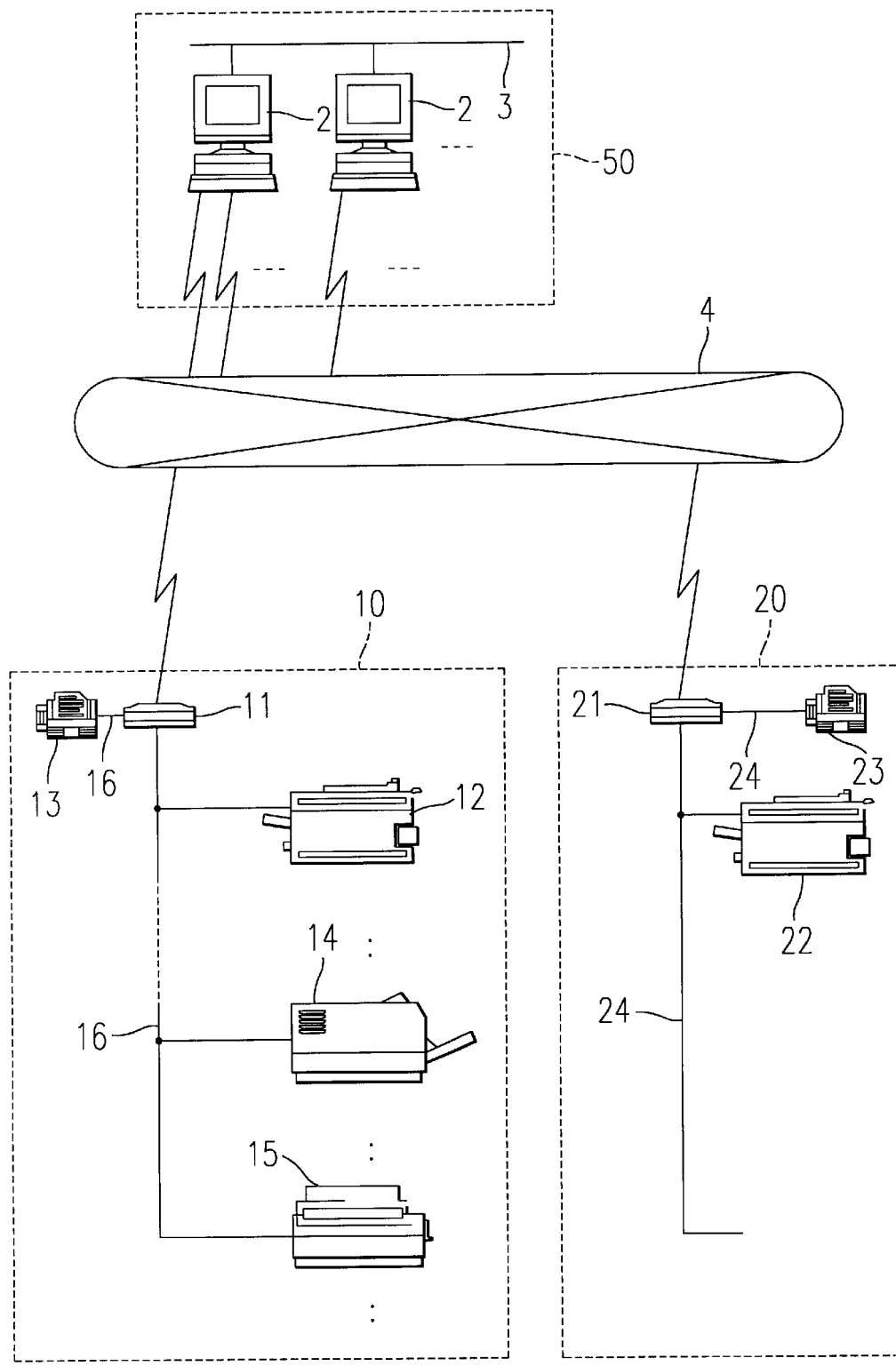
FIG. 1 is a block chart that illustrates a constitution of a remote diagnosis system as one example of the present invention.
Figure 2:
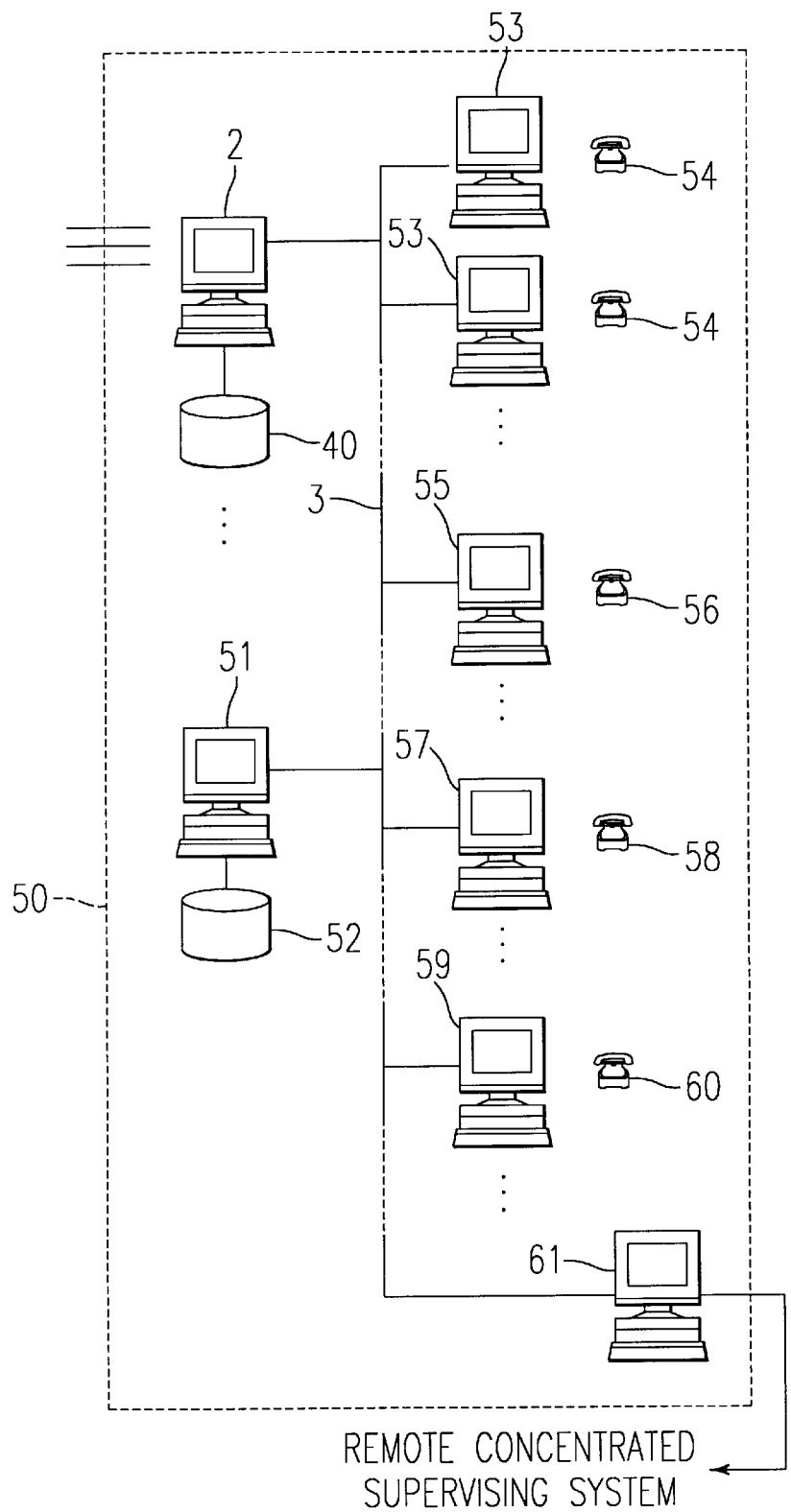
FIG. 2 is a block chart that illustrates a constitution of a central computer system of the remote diagnosis system illustrated in FIG. 1.

The embodiment of the present invention will now be described with reference to the figures in which like reference numerals designate identical or corresponding parts throughout the several views. Hereinbelow, a first embodiment of the present invention is explained referring to FIGS. 1 through 10. A constitution of a remote diagnosis system including a plurality of image-forming apparatuses as one embodiment of the present invention is illustrated in FIGS. 1 and 2.

The remote diagnosis system includes a central computer sub-system 50 and a plurality of image-forming apparatus groups 10 and 20 located at a plurality of user sides. Since conventional converters are employed, explanations thereof are omitted.

The respective groups of image-forming apparatuses 10 and 20 are constituted by a communication adapter 11, 21 that is connected to the central computer sub-system 50 by a public communication network 4, a variety of kinds of image-forming apparatuses such as a copier 12, 22, a facsimile 13, 23, a printer 14, 24, a duplicating machine 15, 25, and so on, and a private use interface line 16, 24 (hereinafter referred to as an I/F line 16, 24) that connects each of the image-forming apparatuses with the communication adapter 11, 21.

The I/F line 11, 24 is constituted by a wire. However, the interface can be wireless if desired. The central computer sub-system 50 includes a plurality of request-receiving computers 2, explained later in detail, and a network 3 such as a LAN (Local Area Network) that connects each of the request-receiving computers 2 with each other. The plurality of request-receiving computers 2 is connected with each of the image-forming apparatuses 12, 13, 14, 15 via the public communication network 4, the communication adapter 11, 21, and the I/F line 16, 24.

One example of the central computer sub-system 50 is illustrated in a block chart in FIG. 2. The central computer- sub system 50 includes a plurality of request receiving computers 2 each having a HDD 40 therein and a database (hereinafter referred to as a DB) server 51 having a HDD 52 therein.

The central computer sub-system 50 further includes a plurality of copier request-dealing computers 53, a plurality of their corresponding telephones 54, a plurality of facsimile request-dealing computers 55, a plurality of their corresponding telephones 56, a plurality of printer request-dealing computers 57, a plurality of their corresponding telephones 58, a plurality of duplicator request-dealing computers 59, a plurality of their corresponding telephones 60, a gate way terminal computer 61, and a network 3 that connects each of the terminal computers with each other.

A reception database is registered in the HDD 40 beforehand, so that manual call data (hereinafter referred to as MC data) related to a request by a user, which are sent from the image-forming apparatuses 12, 22 and so on, are stored in the database of HDD 40. A prescribed user database and a staff s supervising table are each also registered in the HDD 52 of the DB server 51 beforehand.

Figure 4:
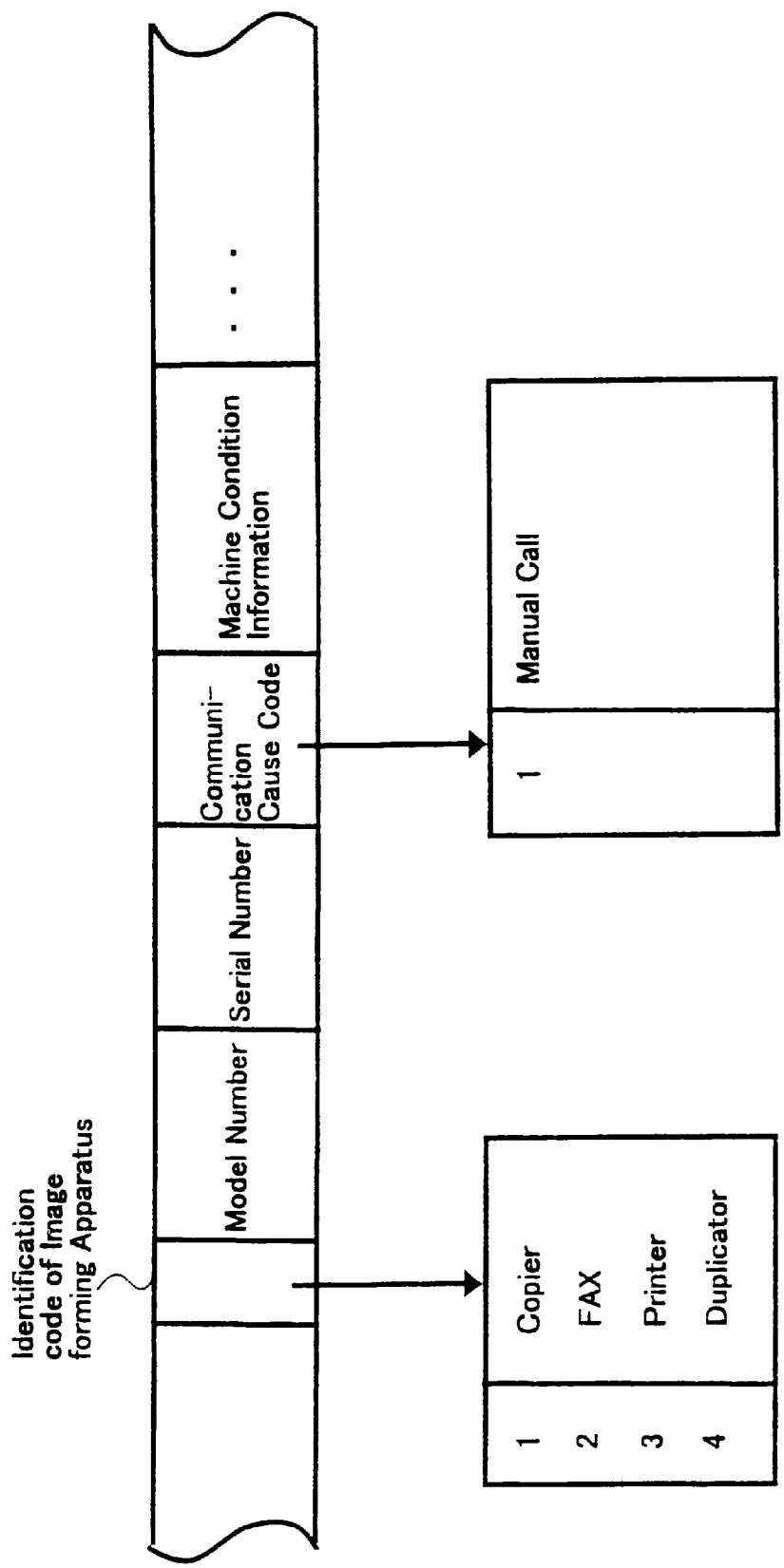
FIG. 4 is a chart that illustrates a format of a manual call data to be stored in a HDD employed in the request-receiving computer illustrated in FIG. 3.

One example of a data format of the MC data, which is to be transmitted from the user and to be stored in the reception DB of the HDD 40 of the request-receiving computer 2 when received by the request-receiving computer 2, is illustrated in FIG. 4. The data format is constituted by an identification data code for identifying a kind of an image-forming apparatus, a model number, a serial number, a communication cause code, data related to a machine condition, and so on.

One example of a user database registered in the HDD 52 of the DB server 51 is illustrated in FIG. 5. The user database stores data related to model numbers allocated to each kind of image-forming apparatus having different codes, model numbers, serial numbers, user names, names of persons of windows of users, telephone numbers, addresses of users, and so on.

One example of the staff-supervising table is illustrated in FIG. 6. The staff-supervising table stores data related to names of staffs each allocated to each of the request-dealing computers 53, and names of models that are capable of responding to MCs. In the staff-supervising table, number 1 indicates that a request-dealing computer 53 described in a request-dealing computer classification column can respond to a request from a model described in a request-dealing computer responsible model column. Whereas, number 0 indicates that a request-dealing computer 53 described in a request-dealing computer classification column cannot respond to a request from a model described in a request-dealing computer responsible model column.

Figure 3:
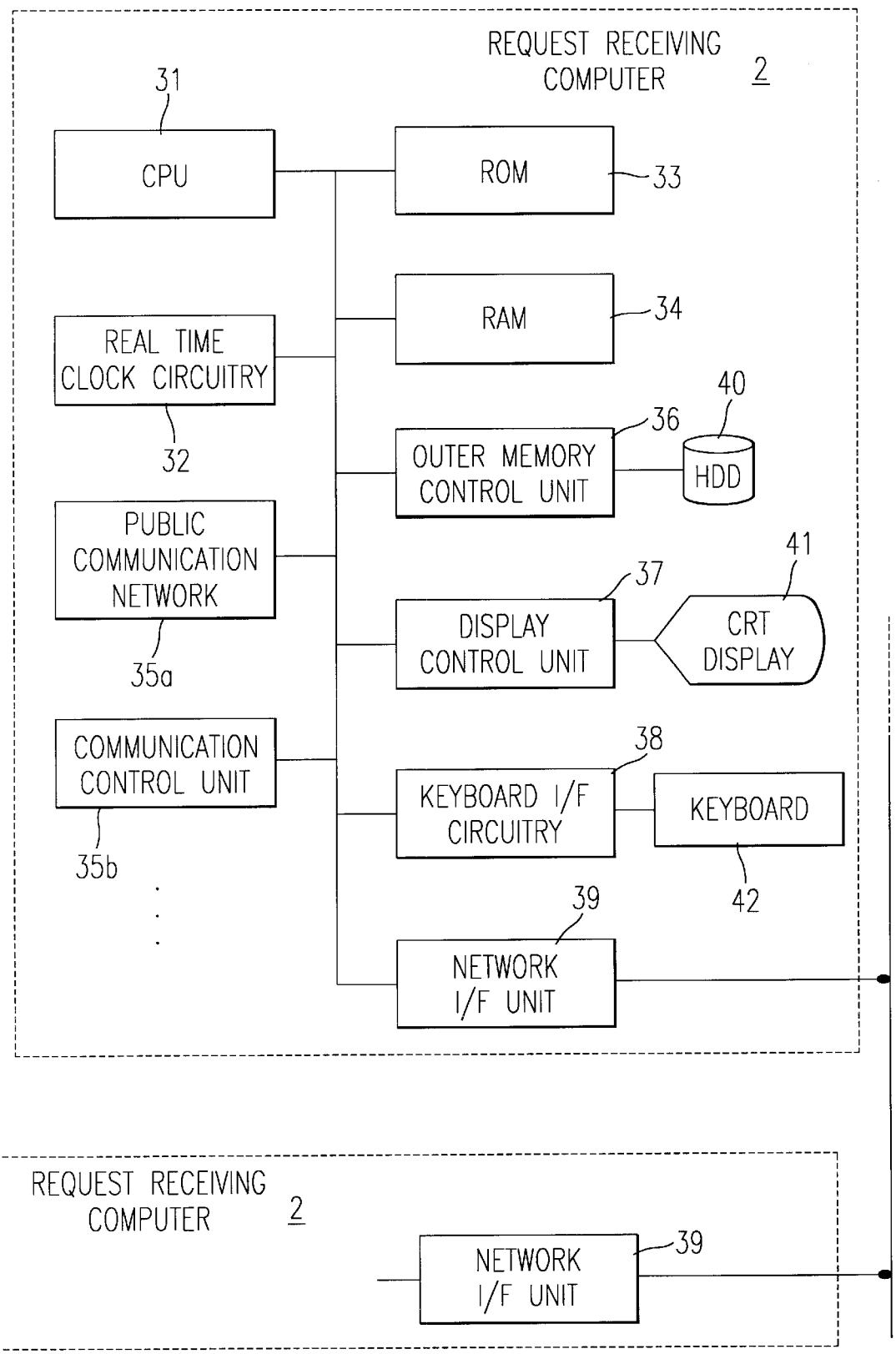
FIG. 3 is a block chart that illustrates a constitution of a request-receiving computer of the remote diagnosis system illustrated in FIG. 1.

One example of a constitution of the request receiving computer 2 illustrated in FIG. 2 is illustrated in FIG. 3 using a block chart. Each of the request receiving computers 2 includes a CPU (Central Processing Unit) 31, a real time clock circuitry 32, a ROM (Read Only Memory) 33, a RAM (Random Access Memory) 34, and a plurality of data communication control units 35a, 35b, and so on. Each of the request-receiving computers 2 further includes an outer memory control unit 36, a display control unit 37, a keyboard I/F circuitry part 38, a network I/F unit 39, a HDD 40, a cathode ray tube (hereinafter referred to as a CRT) display 41, a keyboard 42, and so on.

The CPU 31 controls request-receiving computer 2 using a control program stored in the ROM 33. The real time clock circuitry 32 generates time data to be read by the CPU 31 so that it realizes a real time. The ROM 33 stores therein static data including the control program used by the CPU 31.

The RAM 34 is constituted such that data is freely read therefrom and written thereto. The RAM 34 may serve as a working memory or the like to be used by the CPU 31 when the CPU 31 handles data. The plurality of data communication control units 35a, 35b and so on control data communication to the image-forming apparatuses through the public communication network 4. The outer memory control unit 36 controls an interface between the CPU 31 and the HDD 40. The display control unit 37 controls an interface between the CPU 31 and the CRT display 41. The keyboard I/F circuitry part 38 controls an interface between the CPU 31 and the keyboard 42.

The network I/F unit 39 controls an interface between the DB server 51, the copier request-dealing computer 53, the facsimile request-dealing computer 55, the printer request-dealing computer 57, the duplicator request-dealing computer 59, the gate way terminal computer 61, and so on. Since the DB server 51 illustrated in FIG. 2 includes almost a same constitution as the request-receiving computer 2, a detailed explanation thereof is omitted.

Figure 7:
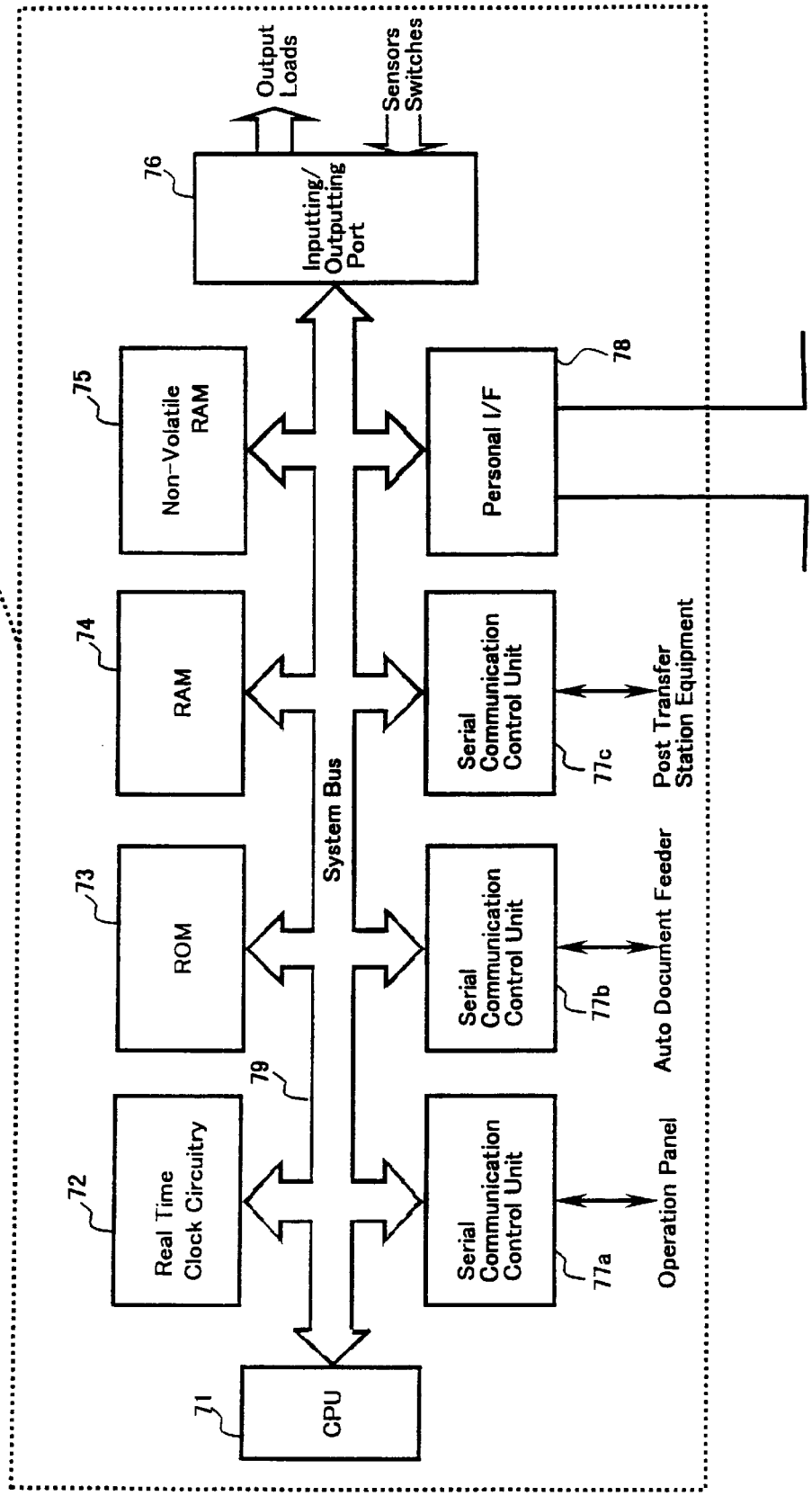
FIG. 7 is a block chart that illustrates a constitution of a control part of an image-forming apparatus illustrated in FIG. 1.

A constitution of a control part of the copier 12, 22 shown in FIG. 1 is illustrated in a block chart in FIG. 7. The control part includes a CPU 71, a real time clock circuitry 72, a ROM 73, a RAM 74, a non-volatile RAM 75, an input-output port 76, serial communication control units 77a, 77b, 77c, a personal I/F 78, and a system bus 79. The CPU 71 controls the copier 12, 22 based on a control program stored in the ROM 73. The real time clock circuitry 72 generates time data to be read by the CPU 71 so that a real time can be realized. The ROM 73 stores a variety of static data including a control program used by the CPU 71.

The RAM 74 is constituted such that data is freely read therefrom and written thereto and may serve as a working memory used by the CPU 71 when it handles data. The nonvolatile RAM 75 stores data indicating, for example, operation modes of the copier which are generated by an operator, for example, through an operation panel (not shown). Batteries (not shown) back-up the non-volatile RAM 75. The input-output port 76 connects with a load generating member (not shown) such as a motor, a solenoid, a clutch, a sensor and a switch, each employed in the copier 12, 22.

The serial communication control unit 77a communicates signals with an operation panel (not shown). The serial communication control unit 77b communicates signals with an auto document feeder (not shown). The serial communication control unit 77c communicates signals with a post transfer station part (not shown).

The personal I/F 78 controls an interface between the communication adapter 11, 21 and the CPU 71. The personal I/F 78 is provided to relieve a load put on the CPU 71 when the CPU 71 directly controls its communication with the communication adapter 11 or 21. The personal I/F 78 can be omitted by executing its fiction in the CPU 71, if the CPU 71 has a sufficient capability of data handling.

Since control parts of the other image-forming apparatuses such as the printer 14, and so on, include almost the same constitutions as the above-mentioned copier 12, 22, detailed explanations thereof are omitted. Each control part of copier 12, 22 functions as a user request data inputting device that inputs data related to a user request, such as an inquiry of an operation know-how. Each control part of copier 12, 22 further functions as a user request data sending device that sends data to the central computer sub-system 50.

A control part including the CPU 31 of the request receiving computer 2 of the central computer sub-system 50 illustrated in FIGS. 2 and 3 may function as a request-receiving device that receives MC data as user request data transmitted from any of the image-forming apparatuses illustrated in FIG. 1. The control part of the request-receiving computer 2 may further function as a request-data-distributing device that automatically distributes user request data when received to a prescribed request-dealing computer 53.

The user-request-data-distributing device may include a request-dealing computer determining member that determines a prescribed request-dealing computer 53 to which the user request data is to be transferred and a request-data-remaining determining member that determines if a prescribed request-dealing computer 53 has remaining user request data to be dealt with. The request-data-distributing device may further include a user-request-data-transferring member that transfers user request data to the prescribed request-dealing computer 53.

The request-data-distributing device may further include a user-request-data-remaining-amount-detecting member that determines if the request-dealing computer 53 has a prescribed amount of request data remaining to be dealt with. The request-data-distributing device may further include a priority-giving member that gives a priority to a prescribed user request data, when a plurality of user request data is received.

Figure 8:
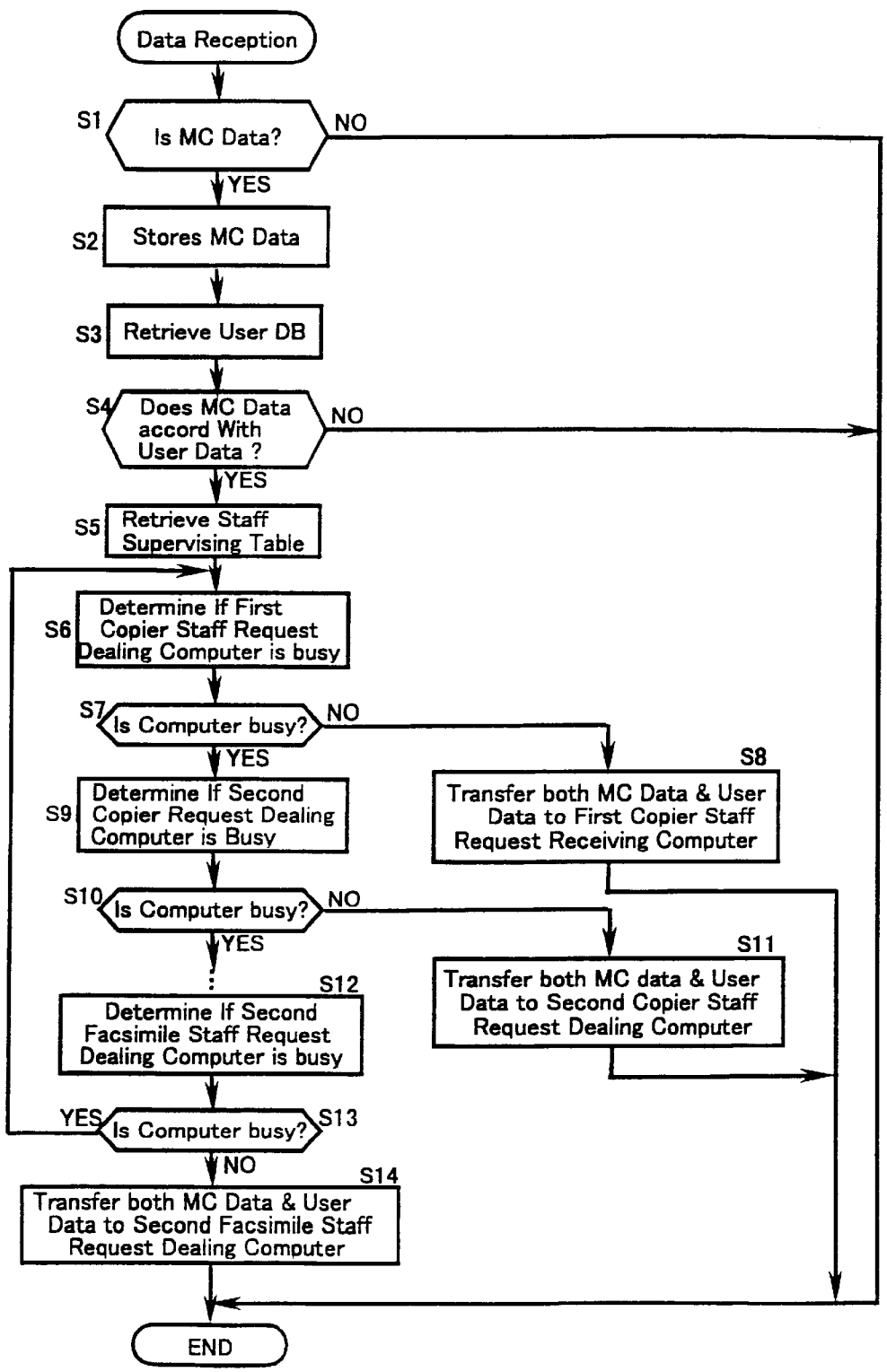
FIG. 8 is a flow chart that illustrates one example of a distribution process of manual call data, which is executed by a CPU employed in the request-receiving computer illustrated in FIG. 3.
Figure 9:
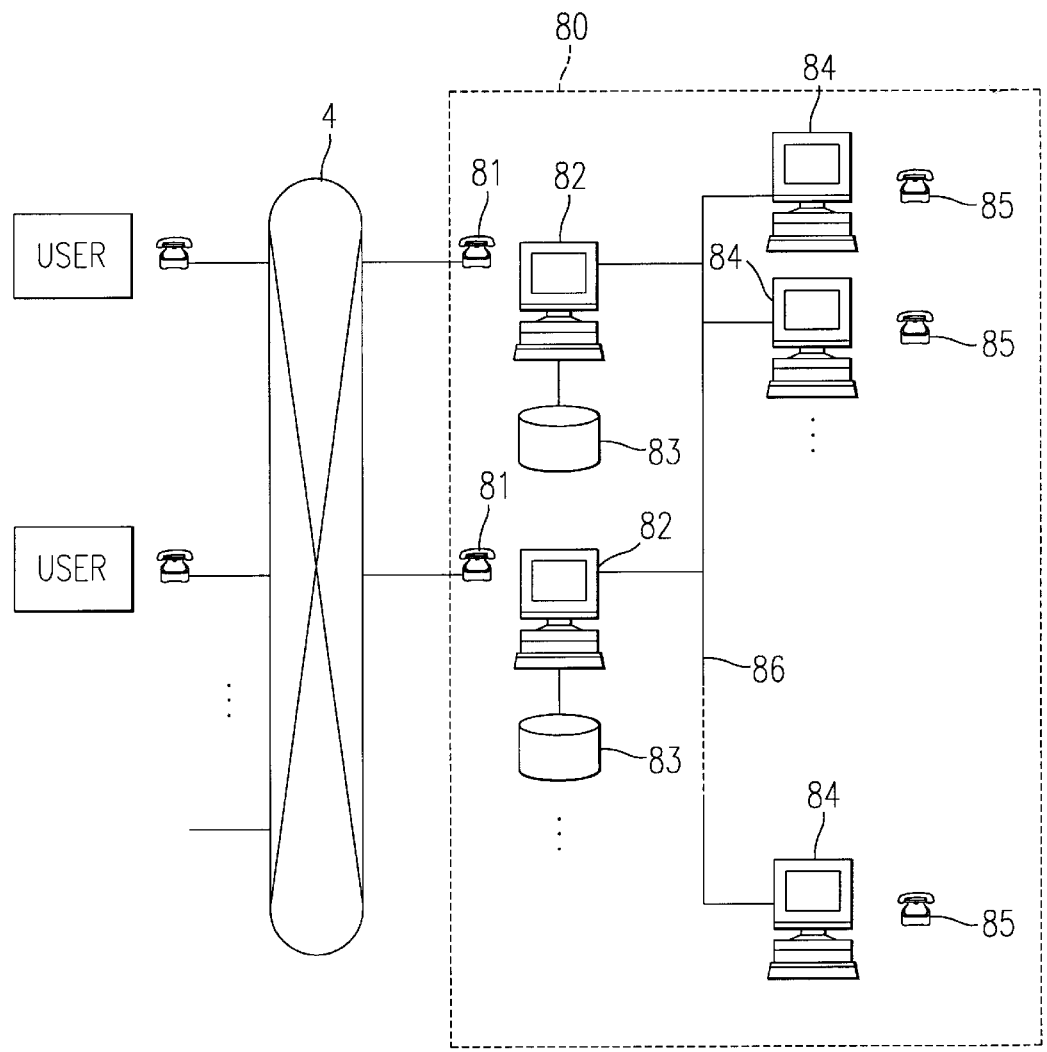
FIG. 9 is a block chart that illustrates a constitution of a background request-receiving computer.
Figure 10:
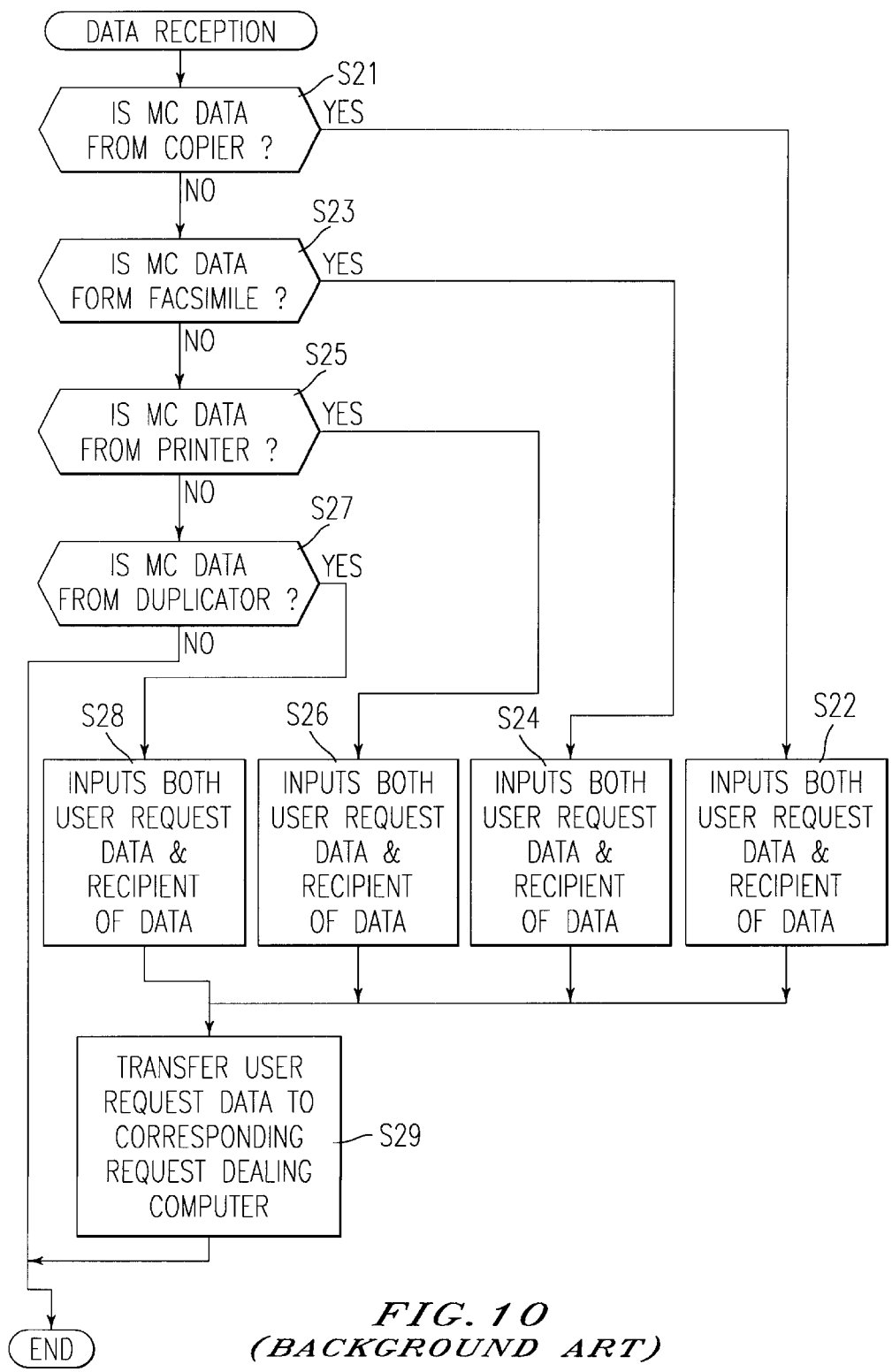
FIG. 10 is a flow chart that illustrates a request data dealing process executed by the background request receiving computer illustrated in FIG. 9.
Figure 17:
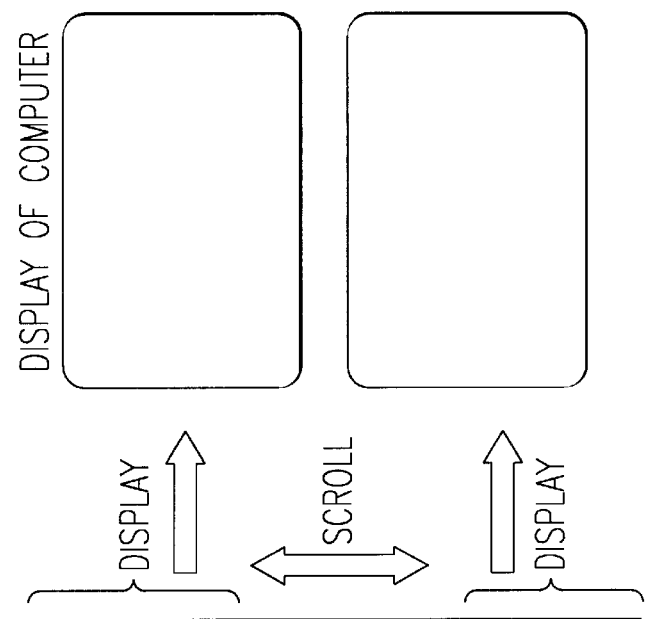
FIG. 17 is a chart that illustrates a table used in a background remote diagnosis system, in which a plurality of user request data are arranged in a prescribed order.
Figure 18:
FIG. 18 is a chart that illustrates a table used in a background remote diagnosis system, in which a plurality of user request data are arranged in a prescribed order and renewed when new user request data is added.

Hereinbelow, an operation of the above mentioned remote diagnosis system is explained in detail referring to FIG. 8.

When manual call (MC) data is input by a user by depressing a manual call key (not shown) on an image-forming apparatus, an image-forming apparatus such as copiers 12, 22 sends the MC data in a prescribed format as illustrated in FIG. 4 to the central computer sub-system 50 via the private I/F line 16 or 24, the communication adapter 11 or 21, and the public communication line network 4. A request-receiving computer 2 of the central computer sub-system 50 receives the MC data and handles the received data in a manner as illustrated in FIG. 8. That is, one example of an operation of distribution of the MC data by the CPU 31 of the request-receiving computer 2 is illustrated in FIG. 8 using a flow chart.

When the CPU 31 receives data from any one of the image-forming apparatuses, it determines if the data includes MC data therein referring to a code included in the format, which indicates a cause of a data communication (step S1). If the MC data are included therein, i.e. YES in step S1, the CPU 31 stores the MC data in a reception DB of the HDD 40 (step S2). The CPU 31 then retrieves a user DB stored in the HDD 52 of the DB server 51 using an image-forming apparatus identification data code (hereinafter referred to as an ID code), a name of a model, and a serial number, each included in the MC data, to find a prescribed user data (step S3).

If the prescribed user data is found, namely a prescribed user data accords with the image-forming apparatus ID code, and so on, i.e. YES in step S4, the CPU 31 then retrieves a staff-supervising table stored in the HDD 52 of the DB server 51 using the image-forming apparatus ID code to determine a prescribed request-dealing computer 53 as a recipient of the MC data (step S5). Determination of the prescribed user-request-dealing computer 53 is explained below. If the image-forming apparatus ID code indicates "1", the MC data is recognized as transferred from a particular kind of a copier.

As illustrated in the example in FIG. 6, request-dealing computers 53 indicating a "1" in a column of the staff-supervising table, which are capable of responding to the user request of the MC data, include both the first and second copier request-dealing computers 53, and a second facsimile request-dealing computer 55. Thus, any one of request-dealing computers 53, 55 are determined as a possible recipient of the user data. The CPU 31 then judges whether the first copier request-dealing computer 53 is in a busy state of dealing with a previous user request (step S6). If the first copier request-dealing computer 53 is not in the busy state, i.e. NO in step S7, the CPU 31 sends the MC data and user data extracted from the user DB to the first copier request-dealing computer 53 through the network 3 (step S8). If the first copier request-dealing computer 53 is in the busy state, i.e. YES in step S8, it is then judged whether the second copier request-dealing computer is busy (step S9). If the second copier request-dealing computer 53 is not in the busy state, i.e. NO in step S10, the CPU 31 sends both the MC data and user data to the second copier request-dealing computer 53 (step S11).

If the second copier request-dealing computer 53 is also in the busy state, i.e. YES in step S10, and another copier request-dealing computer indicating "1" in the column of the staff-supervising table exists, the same operation as mentioned above is repeatedly executed in the another copier by the CPU 31. If all copier request-dealing computers are in the busy state, it is then judged whether a second facsimile request-dealing computer 55 is busy (step S12).

If the second facsimile request-dealing computer 55 is not in the busy state, i.e. NO in step S13, the CPU 31 sends both the MC data and user data to the second facsimile request-dealing computer 53 (step S14). If the second facsimile request-dealing computer 55 is also in a busy state, i.e. YES in step S13, it is then again judged whether the first copier request-dealing computer 53 is still busy, i.e. the operation returns to step S6. The CPU 31 then executes the same operations S7–S14 as mentioned above.

Addressing the user request is executed in a manner as described below. Each of the request-dealing computers 53 displays contents of both MC data and user data on a display, such as a CRT display, when both the MC data and user data are received. A staff of the request-dealing computer 53 can identify a model of the image-forming apparatus, a user's name, a name of a person of a window of the user, a telephone number of the user, and so on, when both data are displayed on the display, and each is included in the MC data and user data. Thus, the staff can respond to the request of the user, for example, by making a telephone call to instruct the user.

Thus, an operator for the request-receiving computer 2 can be omitted. Further, even though both a request-receiving computer 2 and a communication line are increasingly required corresponding to an increase in an amount of MC data, the remote diagnosis system as mentioned above can quickly deal with user requests economically without employing needless operators of the request-receiving computers 2. Thus, operation mistakes made by the operators can be decreased. Further, an amount of an operation work can be almost evened out, and not concentrated onto a particular staff or staffs. That is, the CPU 31 of the request-receiving computer 2 can recognize a request-dealing computer 53 as busy only when a plurality of user requests, such as ten requests or more, remain to be dealt with.

Further, if a staff is notified by the user who has sent a manual call (MC) when making a telephone call that an image-forming apparatus of the user has some kind of a problem, the staff may input data indicating such a problem into his or her request-dealing computer 53, and then send the data to a remote-concentrated-supervising system (not shown) that resolves the problem through the gate way terminal computer 61. The remote concentrated supervising may instruct a service person to call on the user, for example, to repair the image-forming apparatus.

Further, the request-receiving computer 2 may deal with MC data in an order of a priority, when a plurality of the MC data is simultaneously received. For example, a priority order is given to user data A, B, and C. Accordingly, when the request-receiving computer simultaneously receives all of the user data A, B, C, each of MC data A, B and C is dealt with in this order by the request-receiving computer 2.

Hereinbelow, another embodiment of the present invention is explained in detail referring to FIGS. 11 through 19.

When a problem is created in any of the image-forming apparatuses 12, 22, data related to the problem are transmitted to the central computer sub-system 50 via private use I/F lines 16 or 24, communication adapter 11 or 22, and public communication network 4 along with MC data, such as an image-forming ID code, or a user ID code, and so on, during a self-calling of the image-forming apparatus.

The request receiving computers 2 of the central computer sub-system 50 provide a table (T2) in which data related to the problem created in any of the image-forming apparatuses are stored in order of a data receiving time as illustrated in FIG. 11. As illustrated in FIG. 12, the request-receiving computer 2 further provides a table (T3) in which a plurality of user ID codes or image-forming apparatus ID codes, and data of a plurality of priority levels of a resolution of problems, are registered. The request-receiving computer 2 further employs, as illustrated in FIG. 13, a table (T4) in which the data of the plurality of priority levels and a plurality of different color data, each corresponding to each of the plurality of priority levels, are registered. The HDD 40 provides, as illustrated in FIG. 14, a table (T5) in which a plurality of data received by the HDD 40 are stored in a dealing order of priority. The HDD 40 further stores software (program) that resolves a problem. Each of the tables and the software stored in the HDD 40 is not erased even if the supply of electrical power to the HDD 40 is stopped. Further, data of both the tables and the software respectively provided and stored in the HDD 40 can be sent to the RAM 34 and copied thereto every time an electrical power source is newly supplied to the HDD 40. Any of the tables of the HDD 40 may be renewed when any of the tables stored in the RAM 34 is renewed. Each of the tables can be stored in a non-volatile memory such as flush memory or the like.

To provide a specific example of a further operation in the present invention, a priority order may be given as to codes A through C illustrated in FIG. 12. A system manager may determine the priority order. The data related to the priority order are input through a keyboard 42 or the like and stored in ROM 34 by considering the below described matters (1) through (3) regarding the image-forming apparatuses. (1) Whether a user uses a large number of image forming apparatuses can be considered. If the user uses, for example, more than around a hundred image-forming apparatuses, a priority level A may be given thereto. (2) Whether a machine down time resulting from a problem effects a great deal of interruption to a business of a user can be considered. (3) Whether an image-forming apparatus of a user is a model to be importantly supervised can be considered.

Each of the request-receiving computers 2 additionally stores new reception data in the table (T2) of the RAM 34 in order as illustrated in FIG. 11, when data related to problems are transmitted thereto from any of the image-forming apparatuses. Each of the request receiving computers 2 deletes the data from the table (T2) when a prescribed problem indicated by the data has been resolved. The request-receiving computer 2 can be so demanded by the CPU 31.

Every time new reception data indicating a problem or the like are added to the table (T2), or data stored in the table (T2) are deleted therefrom, all of the data stored in the table (T2) are re-arranged to be listed in a priority order referring to the priority level data registered in the table (T3) of the RAM 34. As a result, a table (T5) illustrated in FIG. 14 can be obtained. If there exists a plurality of reception data each having a same priority, each of those same priority data is arranged in an order of a data receiving time.

Each of the reception data stored in the table (T5) is displayed on a display 41 illustrated in FIG. 2 in the priority order. Each of the reception data having a different priority level can be displayed in prescribed different colors from other reception data referring to the table (T4). If a plurality of data related to a problem is received from a plurality of image-forming apparatuses respectively, the table (T5) can be renewed by rearranging the data stored therein, including the new data, in the priority order as illustrated in FIG. 16.

With the above-discussed operations, an operator who operates the request-receiving computer 2 can easily discriminate reception data having a higher priority to be handled through the display surely, since the higher priority level of the reception data appears earlier on the display. This also results because a plurality of reception data is displayed in a priority order of a data receiving time when a plurality of data having a same priority is received. In other words, the operator can easily identify a user that urgently requires, for example, a repair for their image-forming apparatus surely. As a result, claims from users can be relatively decreased.

The following described devices may be provided to easily identify reception data that has not yet been dealt with within a prescribed time period after the data is received. The HDD 40 can store a plurality of time data related to the prescribed time period. The CPU 31 of the request receiving computer 2 compares a time period starting from when the data is received from an image-forming apparatus and the prescribed time period, which is stored in the HDD 40. The request-receiving computer 2 may then display the reception data in a prescribed color indicating a first priority when the time period exceeds the prescribed time period. The reception data can also be displayed in a blinking manner such that a part displaying the reception data turns on and off.

Thus, if reception data to be dealt with still remains after a prescribed time has elapsed, the operator can easily identify the same. As a result, reception data having a relatively lower priority can also be dealt with, since almost all of reception data having a relatively higher priority level will have been dealt with. Further, after a first priority level (A) is given to data that has not yet been dealt with within a prescribed time period after the data is received by the request-receiving computer 2, a plurality of data can be rearranged in a priority order. Further, the reception data can also be displayed in a same manner as mentioned above.

Hereinbelow, still another embodiment of the present invention is explained referring to FIGS. 20 through 27.

When a problem is created in an image-forming apparatus, a user may make a service-person-call (hereinafter referred to as a SC). Even though there exists slight differences between each model of image-forming apparatus, a prescribed kind of problem created in a high voltage power source applied unit, such as a discharge device, and a series of a fixing device of the image-forming-apparatuses cannot be resolved by resetting a status of the image-forming apparatus. These problems are now discussed as examples of service-person-calls (SC) which can also be addressed in the present invention.

Figure 20:
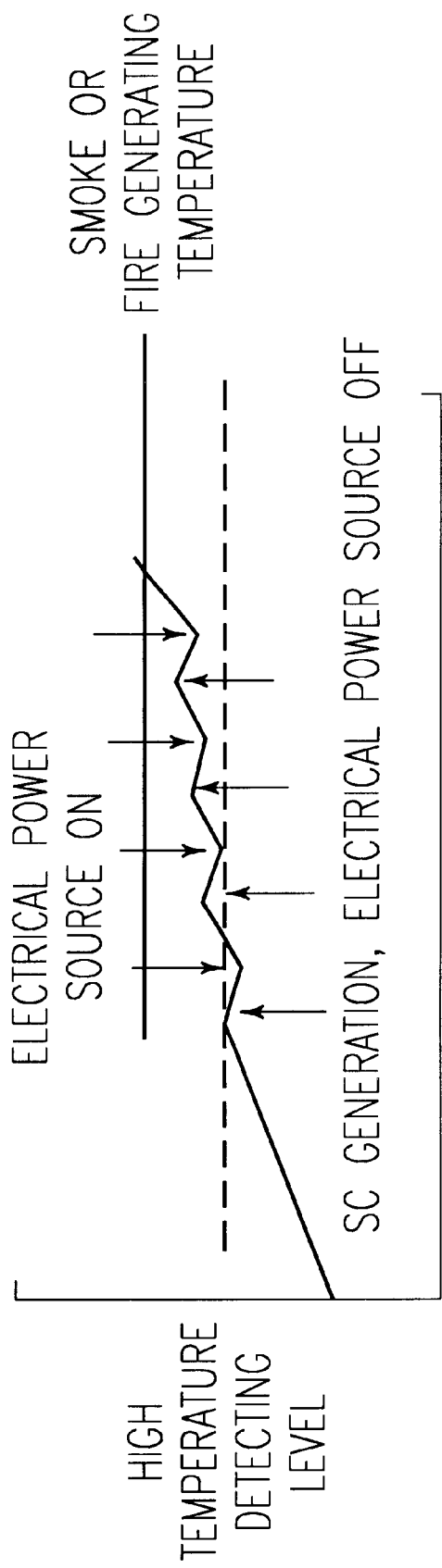
FIG. 20 is a graph that illustrates a relation between an elapsing time and a fixing temperature when an electrical power source switch is successively turned ON and OFF at a time when a problem is created in an image forming apparatus.

For example, if the series of a fixing device has a high temperature, it inherently has a probability to generate smoke and cause a fire. Thus, if a user turns a switch OFF to stop supplying electrical power to the series of the fixing device, and shortly thereafter turns the switch ON to supply power thereof to reset a status of the image-forming apparatus, and repeats such switching operations without removing a cause of the problem, a fixing temperature may reach the smoke and fire-generating level as illustrated in FIG. 20. As a result, the image forming apparatus may generate smoke and cause a fire.

Problems that cannot be resolved by resetting a status of an image-forming apparatus include a case when a fixing temperature is higher than a prescribed uppermost limit or is lower than a prescribed lowermost limit. Such problems may further include cases when a wire of a thermometer of a fixing temperature detecting device is broken, when a fixing heater continues going on when the image-forming apparatus is in a reload mode, and when a fan motor of the fixing device is rocked, and so on.

Another kind of problem that cannot be resolved by resetting a status of the image-forming apparatus may occur in a series of AC (alternating current) devices, such as a discharging device, that use a high voltage of an alternating current, since such devices may be dangerous for a user and also have a probability of smoking and firing. Problems created in the AC device series may include cases when a discharge leakage is caused by a mis-adjustment of a discharge voltage, when a transfer discharge leakage is caused by a mis-adjustment of a transfer discharge voltage, and when a separating discharge leakage caused by a mis-adjustment of a separating discharge voltage, and so on.

In this way, most problems created in devices, except for problems in the fixing device series and the AC device series, can generally be easily resolved by resetting a status of an image forming apparatus. Such easily resolved problems may include a case when a reading device series constituted by at least a lamp, its controller, a scanner, its controller, a magnification device, and a filter, each abnormally operates. Such problems which can generally be easily resolved by resetting a status of an image-forming apparatus further may include cases when a writing device series or a duplex device series each abnormally operates, and when a paper feeding/transporting device series abnormally operates, for example a paper jam occurs. Such problems further may include cases when a data communicating device abnormally communicates, for example, between internal devices of the image-forming apparatus or between the image-forming apparatus and optional devices such as peripheral devices of an automatic document feeder, a sorter, and finisher thereof. Such problems further may include a case when the peripheral devices and counter device series each abnormally operates, and so on.

In this embodiment, each of the controllers of the request-receiving computers 2 may function as a user problem resolution determining device that determines if a problem can be resolved by resetting a status of an image forming apparatus by a user. The controllers of the request-receiving computers 2 further may function as a reset-commandtransmitting device that transmits a reset command to an image-forming apparatus. Each of controllers included in the image-forming-apparatuses 12, 14, 15, 22, etc. may also function as a condition-determining device that determines a condition of the image-forming apparatus, a response-returning-device that returns a prescribed response depending on the condition of the image-forming apparatus, and a reset-operation-executing device that executes a reset operation of the image-forming apparatus.

Hereinbelow, an operation of the above-mentioned remote diagnosis system is explained in detail referring to FIGS. 20 through 27.

Figure 22:
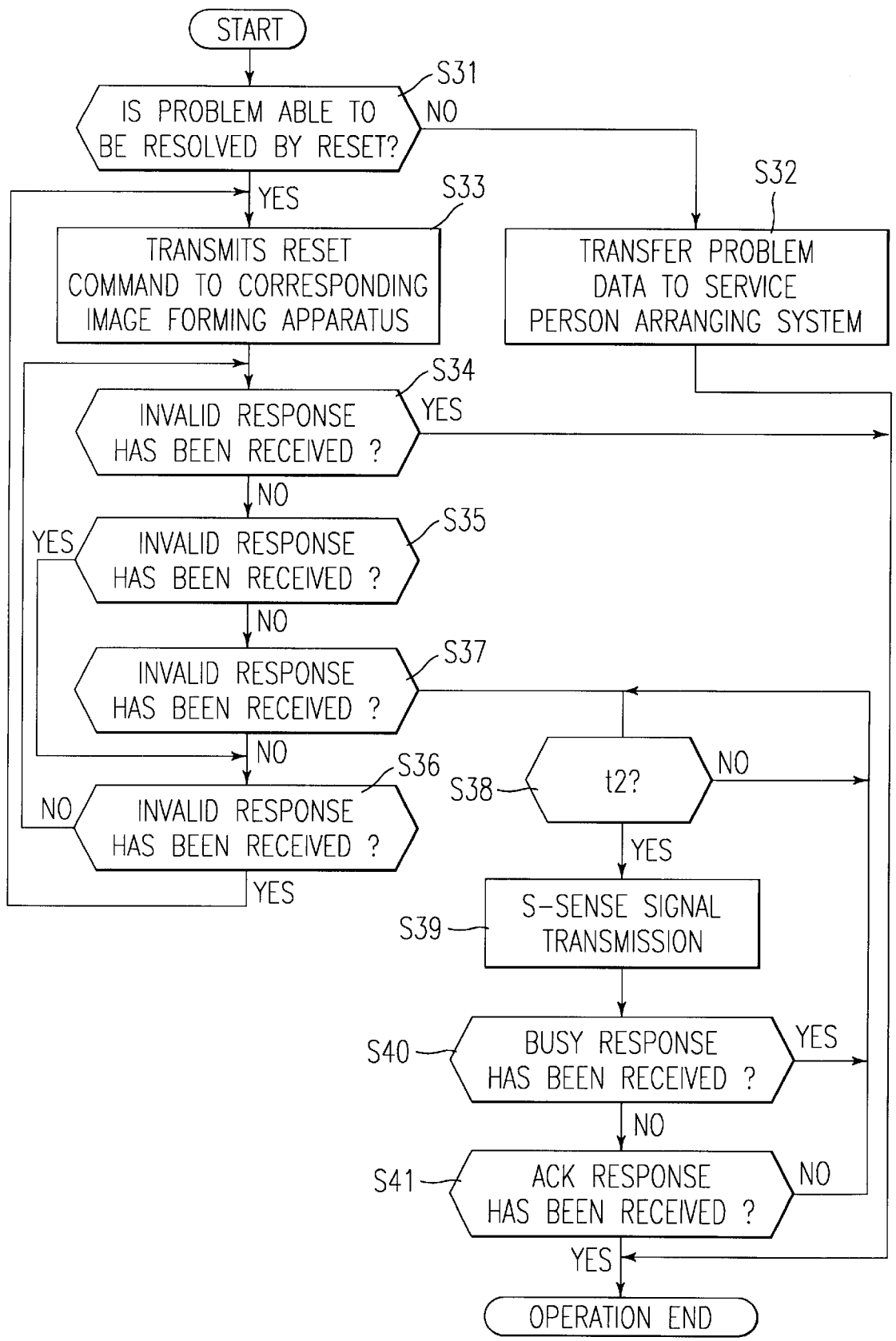
FIG. 22 is a flow chart that illustrates one problem data dealing process to be executed by a central computer system of another embodiment of the present invention.

When a certain kind of a problem is created in any of the image-forming apparatuses 12, 22, etc., data related to the problem is automatically transmitted by a self-call of the image-forming apparatus to the central computer sub-system 50 via the private I/F lines 16, 24, the communication adapter 11, 21, and the public communication network 4 as a service person call (a SC). The central computer sub-system 50 handles the SC as described below. One example of handling the SC after the central computer sub-system 50 has received the SC is illustrated in FIG. 22 using a flow chart.

When the central computer sub-system 50 has received a SC from an image-forming apparatus that has created a problem, a request-dealing computer 53, 55 determines whether the SC can be resolved by resetting a status of the image-forming apparatus by a reset command (step S31).

Figure 21:
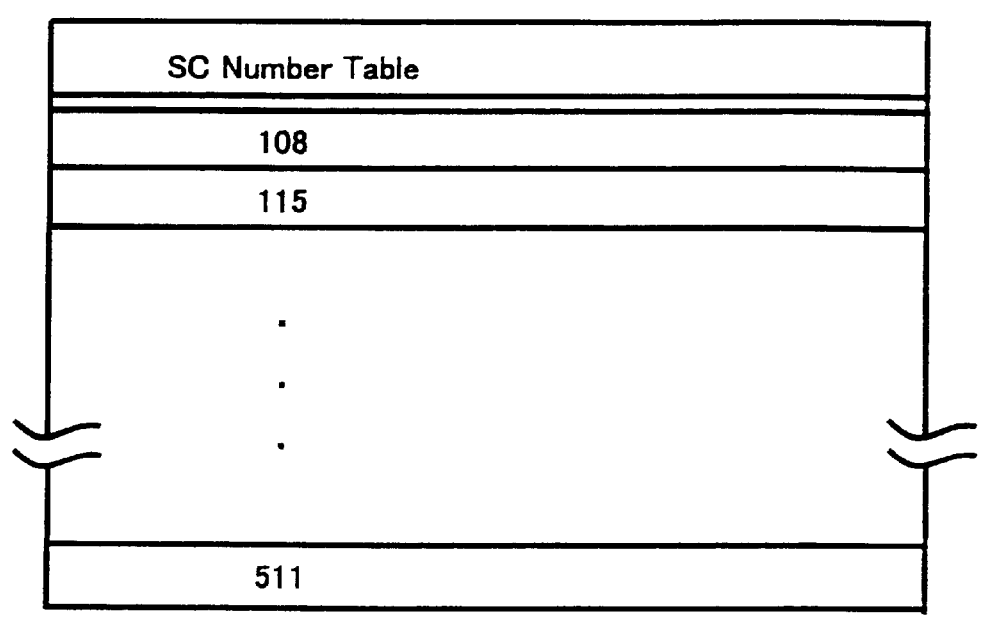
Figure 23:
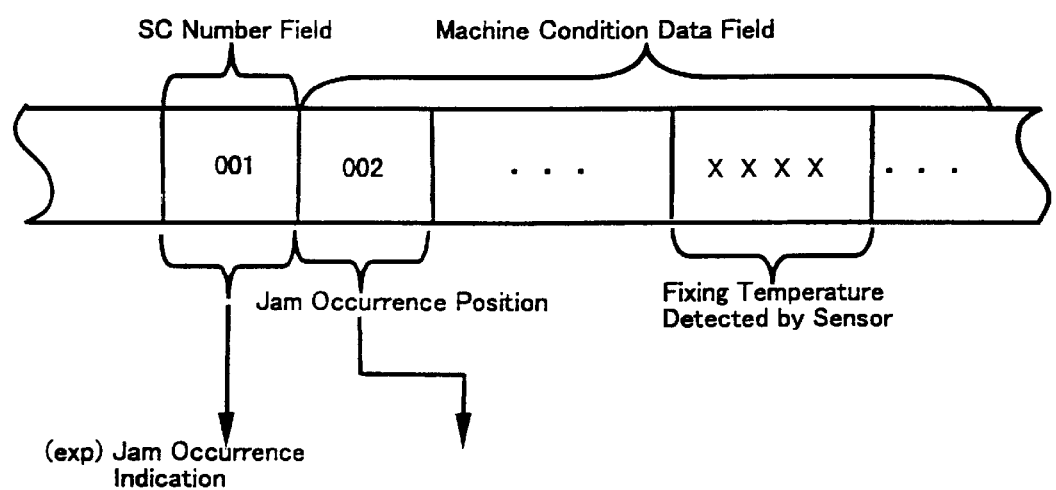
FIG. 23 is a chart that illustrates a format to be stored in a RAM employed in the central computer system, in which problem data related to problem created in an image-forming apparatus is included.

A SC number table as illustrated in FIG. 21 is referred to by the request-dealing computer 53, 55 when it determines whether a SC can be dealt with by the above-mentioned manner. The SC number table of FIG. 21 is provided in a HDD 40 beforehand by inputting the SC number through the outer memory control unit 36. The CPU 31 of the request-dealing computer 53, 55 of the central computer sub-system 50 controls storing of SC data included in a prescribed format as illustrated in FIG. 23 in a RAM 34 through the data communication units 35a, 35b, and so on, when the request-dealing computer 53, 55 receives the SC from the image-forming apparatus.

A SC number put in a SC number field of the SC data format is compared with SC numbers included in the SC number table (of FIG. 21) registered in the HDD 40, one after another. If the SC number of the format accords with one of the SC numbers stored in the table, namely the problem is a potentially easily resolved problem except, as examples, a problem to a fixing device series or AC device series, the CPU 31 determines whether the SC may be dealt with by resetting a status of the image-forming apparatus (step S31).

If the CPU 31 of the request-dealing computer 53 determines that the SC cannot be dealt with, i.e. NO in step S31, the SC data is transferred to a service-person-arrange-supervising device (not shown) (step S32), and then an operation thereof ends. The service person-arrange-supervising device has a function to display contents of the SC data thereon. An operator of the service person-arrange-supervising device can accordingly make a repairing order to a service person.

If the SC can be dealt with by resetting a status of the image-forming apparatus of a problem, i.e. YES in step S31, a reset command is transmitted from the request-dealing computer 2 to the image-forming apparatus via the public communication network 4, the data communication adapter 11 or 21, and the private I/F lines 16 or 24 (step S33). If the CPU 31 of the request-dealing computer 2 receives an INVALID response from the image-forming apparatus, which is generally generated when the problem created in the image-forming apparatus has been resolved, for example by a reset operation of a user, and the INVALID response does not includes a BUSY response that is generally generated when the image-forming apparatus executes an image formation (YES in step S34), the central computer sub-system 50 stops data communication with the image-forming apparatus.

Whereas, if the CPU 3 does not receive an INVALID response, i.e. NO in step S34, and instead receives a BUSY response from the image-forming-apparatus (step S35), the CPU transmits a reset command again (step S33) to the image-forming apparatus when a prescribed time period (t1) has elapsed after a previous transmission of the reset command (step S36).

If, on the other hand, the central computer sub-system 50 receives a VALID response, that is generated when a corresponding image-forming apparatus is available for accepting a reset command, from the image-forming apparatus (step S38), a reset command is transmitted in a same manner as mentioned above, and a status sensing signal (hereinafter referred to as an S-SENCE signal) is also transmitted thereto a prescribed time period (t2) after the reset command is transmitted (step S39) in a same manner as described above. The S-SENSE signal is transmitted so that the CPU 31 of the request-dealing computer 53 of the central computer sub-system 50 can determine if the image-forming apparatus has completed its reset operation.

If the central computer sub-system 50 then receives a BUSY response that is generally generated when a reset operation has not yet been completed from the image-forming apparatus (YES in step S40), the computer system 1 transmits the S-SENCE signal again a prescribed time period (t2) after the previous transmission of the S-SENCE signal (steps S38, S39). If request-dealing computer 53, 55 receives an acknowledge response signal (hereinafter referred to as an ACK response signal), i.e. YES in step S41, a sequence ends.

Figure 24:
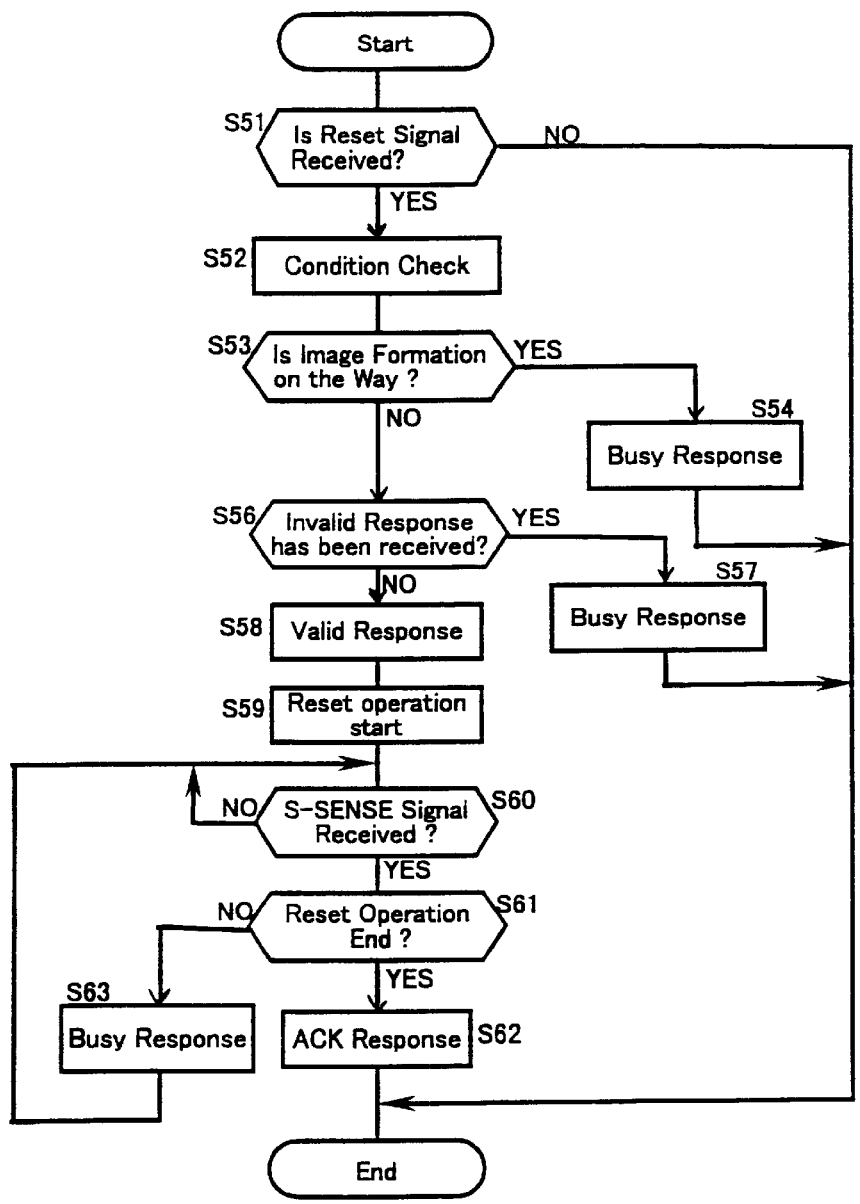
FIG. 24 is a flow chart that illustrates one example of a reset command transmitting and receiving process to be executed by a central computer system and an image-forming apparatus respectively.

Hereinbelow, a reset operation of an image-forming apparatus is explained in detail referring to FIG. 24. Each of the image-forming apparatuses executes the below-described reset operation after a SC is transmitted to the central computer sub system 50 as illustrated in FIG. 24.

The controller of the image-forming apparatus 12 or 22 illustrated in FIG. 1 determines if it has received a reset command from the central computer sub system 50 (step S51). The CPU 71 controlling the personal I/F 78, for example, inspects a condition of the image-forming apparatus (step S52). If the CPU determines the condition that a problem has been resolved, for example, by a switch ON/OFF operation of a user (step S53), and an image-formation thereof is completed (step S56), the CPU transmits an INVALID response signal indicating that the reset command received is invalid to the central computer sub-system 50 (step S57). The sequence then ends. If the image-forming apparatus has not yet completed its operation, the CPU returns a BUSY response signal as an INVALID response to the central computer sub-system 50 (step S54).

If the CPU recognizes the condition of the image-forming apparatus that the problem remains and the image forming apparatus has completed its operation, the CPU transmits a VALID response signal to the central computer sub-system 50 in a same manner as mentioned above (step S58). The CPU then waits for the S-SENCE signal to be transmitted from the central computer sub-system 50 (step S60). The above-mentioned reset operation forcibly returns a problem status to an initial status of the image-forming apparatus with an electrical power source being supplied.

If the reset operation has been completed by the image-forming apparatus before the CPU receives the S-SENCE signal from the central computer sub-system 50, i.e. YES in steps S60, S61, the CPU returns an ACK response to the central computer sub-system 50 (step S62) in a same manner as mentioned above. If, on the other hand, the reset operation of the image-forming apparatus is not completed, the CPU transmits a BUSY response signal as an INVALID response to the central computer sub-system 50 (step S63) in a same manner as mentioned above. The CPU then further waits for another S-SENCE signal from the central computer sub-system 50.

Hereinbelow, an operation of a remote diagnosis system to be executed after an image-forming apparatus has received a reset command is explained in more detail, referring to FIGS. 25 through 27. Each image-forming apparatus and the central computer sub-system 50 may execute the below described operations after the image-forming apparatus has received the reset command.

Figure 25:
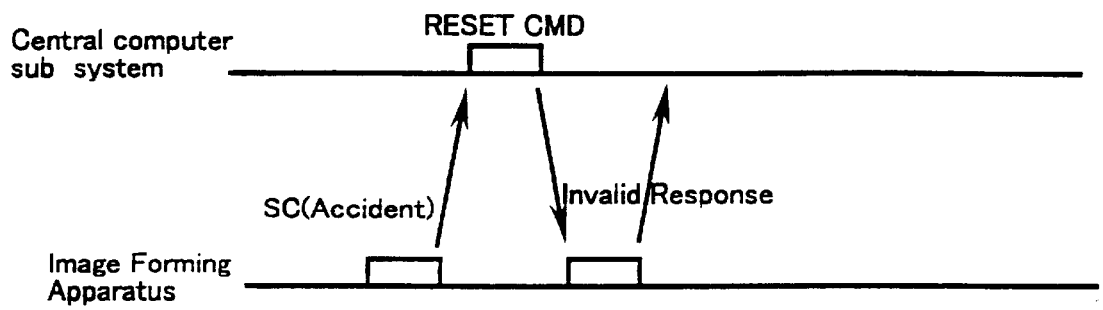
FIG. 25 is a timing chart that illustrates a timing of a reset command transmission from a central computer system and a timing of receipt of a reset command by an image-forming apparatus of the other embodiment of the present invention, when the image-forming apparatus is not executing an image formation.

First, when the image-forming-apparatus receives a reset command, and if a problem created in an image-forming apparatus is resolved, for example, by a switch ON/OFF operation of a user, the image-forming apparatus returns an INVALID response to the central computer sub-system 50 as illustrated in FIG. 25. The reset operation is then not executed.

Figure 26:
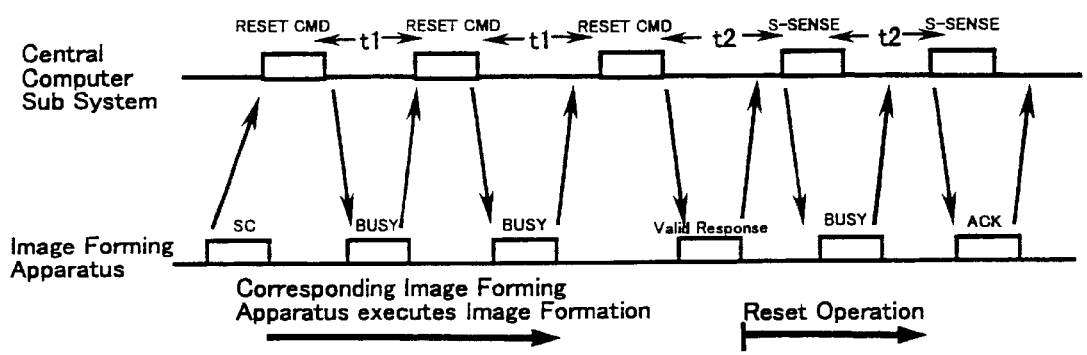
Fig. 26 is a timing chart that illustrates a timing of a reset command transmission from the central computer system and a timing receipt of a reset command by the image-forming apparatus of the other embodiment of the present invention, when the image-forming apparatus is executing an image formation and a service person call remains.

Second, when a problem remains in an image-forming apparatus, for example in peripherals thereof, and the image-forming-apparatus except for the peripherals has not yet completed its operation, a CPU 51 of the image-forming apparatus transmits a BUSY response signal to the central computer sub-system 50 as illustrated in FIG. 26. The central computer sub-system 50 then transmits a reset command to the image-forming apparatus a prescribed time period (t1) after a previous transmission of the reset command. The image-forming apparatus may execute a reset operation, whereas it returns a VALID response to the central computer sub-system 50 if it has completed the image formation when it receives a reset command.

The central computer sub-system 50 may transmit an S-SENCE signal to the image-forming apparatus a prescribed time period (t2) after transmission of the reset command. The image-forming apparatus transmits a BUSY response to the central computer sub-system 50, if a reset operation has not yet been completed.

The central computer sub-system 50 may transmit another S-SENCE signal to the image-forming apparatus a prescribed time period (t2) after transmission of the previous S-SENCE signal. The image-forming apparatus returns an ACK signal to the central computer sub-system 50 when it receives the S-SENCE signal after the reset operation is completed.

Figure 27:
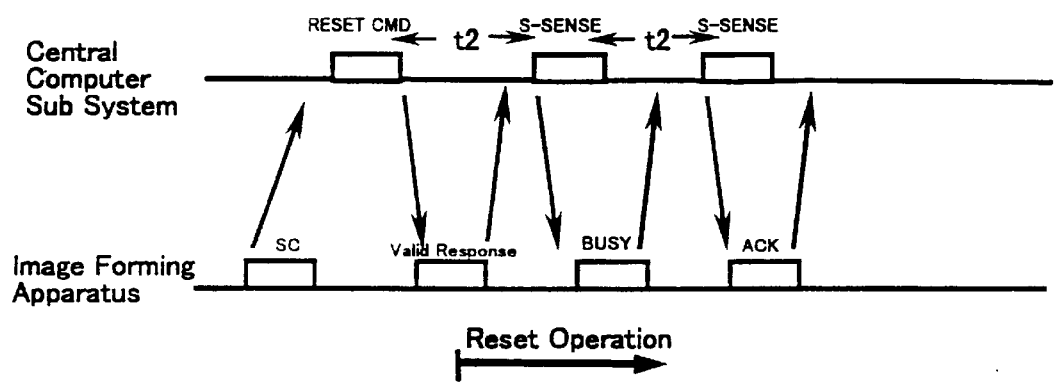
FIG. 27 is a timing chart that illustrates a timing of a reset command transmission from the central computer system and a timing of receipt of a reset command by the image-forming apparatus of the other embodiment of the present invention, when the image-forming apparatus is not executing an image formation and a service person call remains.

Third, the image-forming apparatus that has received a reset command transmits a VALID response to the central computer sub-system 50 and executes a reset operation when a problem still remains and an image formation is completed as illustrated in FIG. 27. The central computer sub-system 50 that has received the VALID response from the image-forming apparatus transmits an S-SENCE signal a prescribed time period (t2) after transmission of the reset command to the image-forming apparatus. The image-forming apparatus that has received the S-SENCE signal transmits a BUSY response to the central computer sub-system 50 if the reset operation is not yet completed.

The central computer sub-system 50 that has received the BUSY response transmits another S-SENCE signal to the image-forming apparatus the prescribed time period after the previous transmission of the S-SENCE signal. The image-forming apparatus returns an ACK response to the central computer sub-system 50, if it receives the other S-SENCE signal after the reset operation is completed.

The image-forming apparatus can return an ACK response to the central computer sub-system 50 when a completion of the reset operation is confirmed, if it received the S-SENCE signal during its reset operation.

Obviously, numerous additional modifications and variations of the present invention are possible in light of the teachings. It is therefore to be understood that within the scope of the appended claims, the present invention may be practiced otherwise than as specifically described herein.

The present application is based on Japanese priority documents 9-337401, 9-348143, and 9-351725, the contents of which are incorporated herein by reference.

What is claimed is:

1. A remote diagnosis system, comprising:
    a central computer system configured to receive user request data related to a user request and to address said user data;
    at least one image forming apparatus connected to said central computer system and including a user request data input device, through which user request data is input, and a user request data transmitting device configured to transmit said user request data from said at least one image forming apparatus;
    a data communication adapting device configured to collect said user request data from said at least one image forming apparatus and transmit said user request data to said central computer system;
    an interface configured to interface said at least one image forming apparatus with said data communication adapting device;
    a communication network configured to connect said data communication adapting device with said central computer system; wherein,
    said central computer system includes:
        a plurality of request-dealing terminal computers each separately taking charge of at least one corresponding image forming apparatus to address said user request data; and
        a data receiving terminal computer configured to receive said user request data from said at least one image forming apparatus and automatically distribute said user request data to prescribed of said plurality of request-dealing computers responsible for said user request data.

2. A remote diagnosis system as claimed in claim 1, further including:
    a request-dealing computer determining device employed in each of said plurality of request-receiving computers, configured to determine at least one prescribed request-dealing computer to which said user request data is transferred based on received identification data of said user request data.

3. A remote diagnosis system as claimed in claim 1, further including:
    a remaining request data inspecting device configured to inspect whether a prescribed amount of user request data to be addressed remains in said prescribed request-dealing computer; and a user request data transfer-controlling device configured to control said user request data inspecting device such that said user request data is transferred only when a predetermined amount of user request data does not remain in said prescribed request-dealing computer.

4. A remote diagnosis system as claimed in claim 3, wherein said prescribed amount of user request data comprises at least one user request data.

5. A remote diagnosis system as claimed in claim 3, wherein said prescribed request-dealing computer addresses a plurality of user request data in a prescribed priority order.

6. A remote diagnosis system, comprising:

a central computer system configured to receive user request data related to a user request and to address said user request data;

at least one image-forming apparatus connected to said central computer system and including a user request data input device, through which data related to said user request data is input, and a user request data transmitting device configured to transmit said user request data having identification data therein;

a data communication adapting device configured to collect said user request data from said at least one image forming apparatus and transmit said user request data to said central computer system;

an interface configured to interface said at least one image forming apparatus with said data communication adapting device;

a communication network configured to connect said data communication adapting device with said central computer system; wherein, said central computer system includes:

a plurality of request-dealing computers each separately taking charge of at least one image-forming apparatus to address said user request, wherein, each of said request-dealing computers includes:

a user request data receiving and storing device configured to receive and store a plurality of said user request data in an order of a user request data receiving time;

a priority order-determining device configured to determine a priority order of addressing said user requests;

a displaying device configured to display said user request data; and a display controlling device configured to control said displaying device such that said user request data are displayed in said priority order.

7. A remote diagnosis system as claimed in claim 6, wherein said display controlling device controls said displaying device such that said user request data are displayed in order of said user request data receiving time, when a plurality of user request data having a same priority are received by said user request data receiving device.

8. A remote diagnosis system as claimed in claim 6, wherein said displaying device displays said user request data having different priority levels in different colors.

9. A remote diagnosis system as claimed in claim 6, wherein said request-dealing computer includes a response time setting device, through which a prescribed time period corresponding to said image-forming apparatus or user for addressing said user request are input, and said displaying device displays user request data in a different manner when said user request data has not been addressed within said prescribed time period set by said response time setting device.

10. A remote diagnosis system as claimed in claim 9, wherein said displaying device blinks said problem request data.

11. A remote diagnosis system as claimed in claim 9, wherein said display controlling device gives a first priority to said user request data and then arranges a plurality of user request data in a prescribed priority order.

12. A remote diagnosis system, comprising:

a central computer system configured to receive problem data related to a problem and to resolve said problem;

at least one image-forming apparatus connected to said central computer system and including a self-call data generating device that generates self-call data constituted by identification data and said problem data, and a self-call data transmitting device that transmits said self-call data from said image-forming apparatus to said central computer system by self-calling;

a data communication adapting device configured to collect said self-call data from said at least one image-forming apparatus and transmit said self-call data to said central computer system;

an interface configured to interface said at least one image-forming apparatus with said data communication adapting device;

a communication network configured to connect said data communication adapting device with said central computer system, wherein;

said central computer system includes:

a plurality of problem resolving terminal computers each separately taking charge of a prescribed image-forming apparatus to resolve a problem therein, wherein, each of said problem resolving terminal computers includes:

a condition determining device configured to determine if said problem has been resolved by a user; and a reset command-transmitting device that transmits a reset command to said image-forming apparatus only when said image-forming apparatus determines that a status of said image forming apparatus of a problem is not reset by said user.

13. A remote diagnosis system as claimed in claim 12, further comprising:

a status determining device disposed in said image forming apparatus configured to determine a status of said image forming apparatus when said reset command is received by said image-forming apparatus; and a response transmitting device disposed in said image-forming apparatus, which transmits a valid or invalid answer data to said central computer system through said interface, data communication adapting device, and data communication network depending on said status of the image-forming apparatus.

14. A remote diagnosis system as claimed in claim 13, wherein:

said valid answer data is generated when said image forming apparatus is determined to have resolved said problem or is executing an image formation, and said invalid answer data is generated when said image-forming apparatus is determined as not having resolved said problem or is not executing said image formation.

15. A remote diagnosis executing method, comprising steps of:

generating user request data related to a user request from an image forming apparatus;

transmitting said user request data to a central computer system from said image forming apparatus;

receiving said user request data at a request-receiving computer of said central computer system;

determining a prescribed request-dealing computer based on identification data included in said user request data; and automatically distributing said user request data to said prescribed request-dealing computer.

16. A remote diagnosis executing method as claimed in claim 15, further comprising a step of:

resolving a plurality of user request data in a prescribed priority order.

17. A remote diagnosis executing method comprising steps of:

generating user request data related to a user request from an image forming apparatus;

transmitting said user request data to a central computer system from said image forming apparatus;

receiving said user request data at a request receiving computer of said central computer system;

determining a prescribed user request resolving terminal computer based on identification data included in said user request data;

determining whether a prescribed amount of user request data to be addressed remains in a prescribed request dealing computer; and transferring said user request data only when said prescribed amount of said user request data does not remain in said prescribed terminal computer.

18. A remote diagnosis executing method as claimed in claim 17, further comprising a step of:

resolving a plurality of user request data in a prescribed priority order.

19. A remote diagnosis executing method, comprising steps of:

generating problem data related to a problem of an image forming apparatus in said image-forming apparatus;

transmitting said problem data to a central computer system from said image-forming apparatus by self-calling;

receiving said problem data at a data receiving terminal computer of said central computer system;

determining a prescribed problem resolving terminal computer based on identification data included in said problem data;

automatically distributing said problem data to a prescribed problem resolving terminal computer;

determining a priority order of addressing said problem data; and displaying said problem data in said priority order.

20. A remote diagnosis executing method as claimed in claim 19, further comprising a step of:

displaying said problem data in order of a problem data receiving time, when a plurality of problem data having a same priority are received.

21. A remote diagnosis operation method as claimed in claim 19, further comprising a step of:

displaying said problem data having different priority levels in different colors.

22. A remote diagnosis operation method, comprising steps of:

generating problem data related to a problem of an image forming apparatus in said image forming apparatus;

transmitting said problem data to a central computer system from said image forming apparatus by self-calling;

receiving said problem data at a data receiving terminal computer of said central computer system;

determining a prescribed problem resolving terminal computer based on identification data included in said problem data;

automatically distributing said problem data to said prescribed problem resolving terminal computer;

determining whether a problem can be resolved by a user by resetting a status of said image-forming apparatus; and transmitting a reset command to said image forming apparatus from said problem resolving terminal computer when said status of said image forming apparatus is not reset by said user.

23. A remote diagnosis system as claimed in claim 22, further comprising steps of:

determining a status of said image-forming apparatus, when said reset command is received by said image-forming apparatus; and responding by transmitting a valid or invalid answer data to said central computer system from said image forming apparatus depending on said status of the image forming apparatus.

24. A remote diagnosis system as claimed in claim 22, further comprising steps of:

determining a status of said image-forming apparatus, when said reset command is received by said image-forming apparatus; and responding by transmitting invalid answer data to said central computer system from said image-forming apparatus when said image-forming apparatus is executing image formation when received said reset command signal.

25. A remote diagnosis system as claimed in claim 24, further comprising a step of:

re-transmitting said reset command when said invalid answer data includes a BUSY response data.

26. A remote diagnosis system as claimed in claim 24, further comprising a step of:

retransmitting said reset command after said image forming apparatus stops said image formation when said invalid answer data includes BUSY response data.

27. A remote diagnosis system, comprising:

central computer means for receiving user request data related to a user request and for addressing said user request data;

image-forming means for forming images connected to said central computer system and including user request data inputting means for inputting request data and data transmitting means for transmitting said user request data from said image-forming means;

data communication adapting means for collecting said user request data from said image-forming means and for transmitting said user request data to said central computer means;

interfacing means for interfacing said image forming means with said data communication adapting means;

communication networking means for communicating said user request data from communication adapting means with said central computer system; wherein, said central computer means includes:

request-dealing terminal computer means for taking charge of a prescribed image-forming means to address corresponding of said user request data; and data receiving terminal computer means for receiving said user request data from said image forming means and for automatically distributing said user request data to said prescribed request-dealing computer means for said corresponding user request data.

* * * * *